(12) United States Patent
Carlson et al.

(10) Patent No.: US 10,953,726 B2
(45) Date of Patent: Mar. 23, 2021

(54) BATTERY THERMAL MANAGEMENT

(71) Applicant: GM Global Technology Operations LLC, Detroit, MI (US)

(72) Inventors: Michael H. Carlson, Farmington Hills, MI (US); Eugene V. Gonze, Pinckney, MI (US); Lawrence P. Ziehr, Clarkston, MI (US); Tanner E. Goeson, Bowmanville (CA); Kyle Holihan, South Lyon, MI (US); Cameron Smith, Milford, MI (US); Michele Bilancia, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 121 days.

(21) Appl. No.: 16/392,077

(22) Filed: Apr. 23, 2019

(65) Prior Publication Data
US 2020/0338959 A1  Oct. 29, 2020

(51) Int. Cl.
*B60H 1/14* (2006.01)
*H01M 10/44* (2006.01)
(Continued)

(52) U.S. Cl.
CPC .............. *B60H 1/143* (2013.01); *B60L 53/14* (2019.02); *B60L 58/27* (2019.02); *H01M 10/443* (2013.01); *H01M 10/635* (2015.04); *B60L 2240/545* (2013.01); *B60L 2270/44* (2013.01); *H01M 2220/20* (2013.01)

(58) Field of Classification Search
CPC ...... B60H 1/143; B60H 1/00278; B60H 1/04; B60L 58/27; B60L 58/10; B60L 58/12; B60L 58/13; B60L 58/24; B60L 58/25; B60L 53/14; B60L 2240/545;
(Continued)

(56) References Cited

U.S. PATENT DOCUMENTS 8,179,085 B2 * 5/2012 Artelsmair ................ H02J 7/00
320/104
8,313,850 B1 * 11/2012 LePort .................. H01M 10/42
429/50
(Continued)

FOREIGN PATENT DOCUMENTS

CN   110696624 A  *  1/2020
DE   19824448 A1  * 12/1999  ............ H02J 7/0031
(Continued)

*Primary Examiner* — Daniel E. Namay
(74) *Attorney, Agent, or Firm* — Quinn IP Law

(57) ABSTRACT

A method for managing thermal energy of a vehicle having a battery and an electric propulsion system is provided. The system monitors a current battery temperature, after the vehicle is connected to an outside power source at a plug time, and determines an outside air temperature. The system predicts a cabin heating temperature for a subsequent drive cycle. The subsequent drive cycle occurs when the vehicle is no longer connected to the outside power source. If the predicted cabin heating temperature is greater than the outside air temperature, the system heats the battery to a thermal storage temperature that is greater than a target operating temperature of the battery. Therefore, thermal energy is stored within the battery, and may be transferred to heat the cabin.

16 Claims, 6 Drawing Sheets

(51) Int. Cl.
*B60L 58/27* (2019.01)
*B60L 53/14* (2019.01)
*H01M 10/635* (2014.01)
*B60L 9/00* (2019.01)
*B60L 9/16* (2006.01)

(58) Field of Classification Search
CPC ............. B60L 2270/44; H01M 10/635; H01M 10/443; H01M 2220/20
USPC ................... 237/12.3 A; 180/65.29; 320/134
See application file for complete search history.

(56) References Cited

U.S. PATENT DOCUMENTS

| | | | | |
|---|---|---|---|---|
| 8,679,659 | B2 * | 3/2014 | Claypole | H01M 10/6569 429/50 |
| 9,531,037 | B2 * | 12/2016 | Ogg | H01M 10/441 |
| 9,564,769 | B2 * | 2/2017 | Poulton | H02J 7/007 |
| 10,090,682 | B2 * | 10/2018 | Snyder | H02J 7/0022 |
| 10,153,651 | B2 * | 12/2018 | Taylor | H02J 7/0029 |
| 10,806,180 | B2 * | 10/2020 | Otiaba | A24F 40/90 |
| 2008/0238356 | A1 * | 10/2008 | Batson | H02J 7/342 320/103 |
| 2008/0238363 | A1 * | 10/2008 | Bourilkov | H02J 7/0071 320/107 |
| 2009/0015203 | A1 * | 1/2009 | Oakes | G05B 15/02 320/132 |
| 2014/0277869 | A1 * | 9/2014 | King | B60L 58/27 701/22 |
| 2018/0123357 | A1 * | 5/2018 | Beaston | H02J 7/0019 |

FOREIGN PATENT DOCUMENTS

| | | | | |
|---|---|---|---|---|
| JP | 05062718 | A * | 3/1993 | |
| JP | 09182310 | A * | 7/1997 | ............ H02J 7/0029 |
| JP | 10136581 | A * | 5/1998 | ....... G01R 19/16542 |
| JP | 6545435 | B2 * | 7/2019 | |

* cited by examiner

BATTERY THERMAL MANAGEMENT

INTRODUCTION

The present disclosure relates to thermal management of batteries in vehicles having electric propulsion systems. Exemplary vehicles include electric or plug-in hybrid vehicles.

SUMMARY

A system and method for managing thermal energy of a vehicle having a battery and an electric propulsion system are provided. The system monitors a current battery temperature, after the vehicle is connected to an outside power source at a plug time, and determines an outside air temperature.

The system predicts a cabin heating temperature for a subsequent drive cycle. The subsequent drive cycle occurs when the vehicle is no longer connected to the outside power source. If the predicted cabin heating temperature is greater than the outside air temperature, the system heats the battery to a thermal storage temperature that is greater than a target operating temperature of the battery. Therefore, thermal energy is stored within the battery.

Generally, heating the battery to the thermal storage temperature occurs while charging the battery from the outside power source. Additionally, heating may occur only if the thermal storage temperature and the cabin heating temperature are both greater than the outside air temperature. The system may then transfer the thermal energy stored within the battery to a cabin of the vehicle, such that the cabin is heated by thermal energy from the battery. Heating to the thermal storage temperature may occur prior to a driving start time, which occurs after the vehicle is disconnected from the outside power source.

The system or method may predict a driving start time, which occurs after the vehicle is disconnected from the outside power source, and may determine a charge duration between a charge start and a charge stop, at which time the battery has received a sufficiently full state of charge. Then, if the driving start time is later than the charge duration, the system delays the charge start until after the plug time, and begins the charge start, such that the charge duration is at least 80% of the time lapse before the predicted driving start time.

The charge duration may be calculated to include a base charge time, during which the battery is brought to a target state of charge, and a time to heat to a minimum charging temperature, during which the battery is brought to a minimum temperature for charging. The charge duration may also be calculated to include a conditioning time, during which the battery is heated by one of a resistive heater and a heat pump. These elements may be commingled in the charge duration, charge time, or recharge time calculation.

In some configurations, the system may generate thermal energy with one of a resistive heater and a heat pump, while the vehicle is still connected to the outside power source. The system may then circulate the generated thermal energy to the battery, such that the thermal storage temperature of the battery is greater than a natural charging temperature, which would have resulted from charging alone.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIGS. 5A-D are schematic charts illustrating exemplary thermal management strategies for selectively cooling a battery to extend driving range and shelf life, with: FIG. 5A showing active battery cooling during driving or following driving; FIG. 5B showing delayed cooling, or non-cooling, based on actual average lifetime battery temperature; FIG. 5C showing two examples of active battery cooling while driving based on differentials between target and actual average lifetime battery temperature; and FIG. 5D showing early battery cooling based on a predicted drive cycle in which the battery temperature is likely to increase in the future.

FIGS. 7A-C are schematic charts illustrating exemplary thermal management strategies for selectively heating a battery during preconditioning to extend subsequent driving range, with: FIG. 7A showing thermal energy added to the battery after recharge; FIG. 7B showing modified charge cycle start time, such that thermal energy is selectively stored in the battery; and FIG. 7C showing thermal energy added to the battery during recharge.

DETAILED DESCRIPTION

Figure 1:
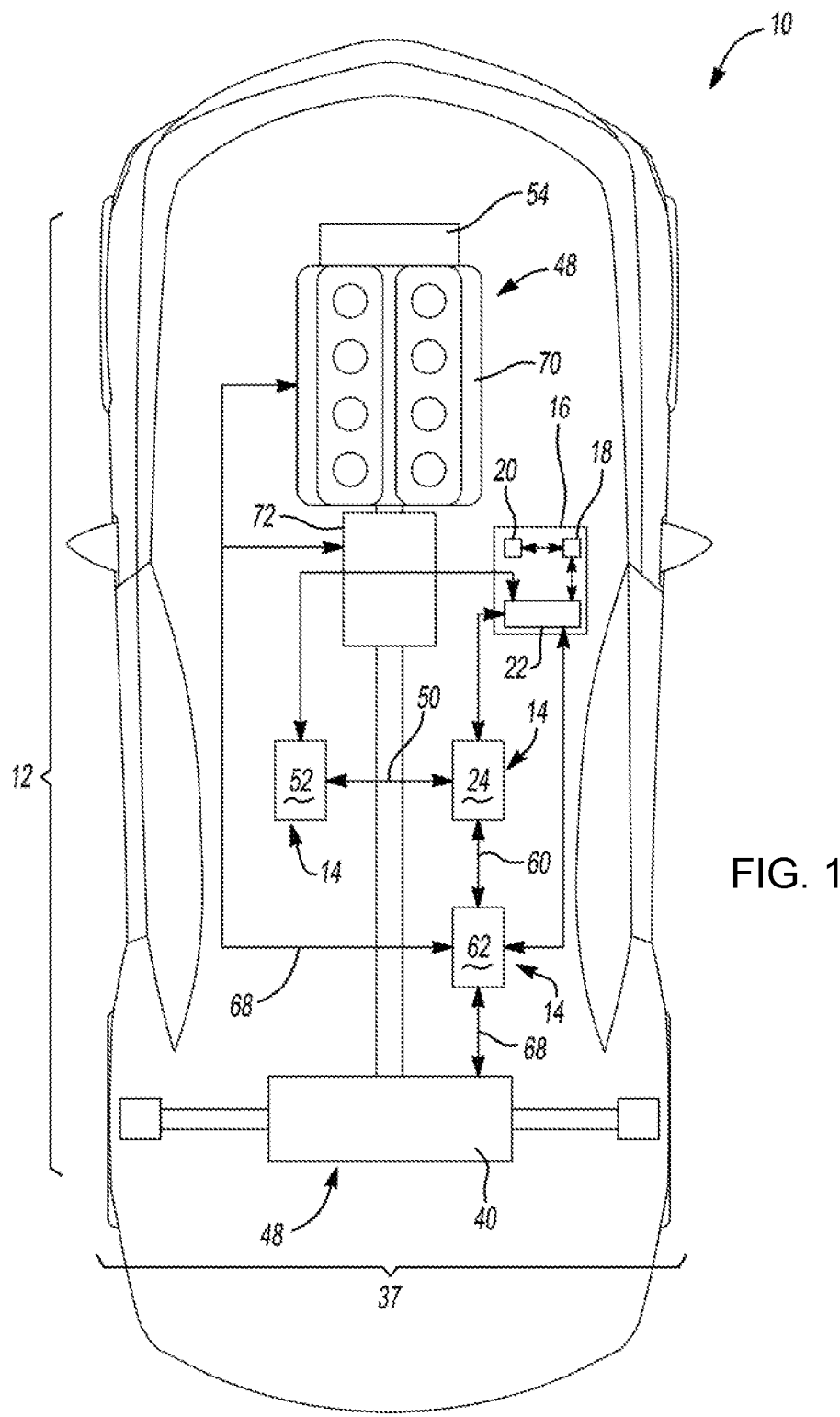
FIG. 1 is a schematic environmental view of a motor vehicle having an electric propulsion system, such as a hybrid electric vehicle or battery electric vehicle.

Referring to the drawings, like reference numbers refer to similar components, wherever possible. FIG. 1 schematically illustrates a top view of a motor vehicle 10. While the vehicle 10 is depicted as a car, it should be understood that the vehicle 10 may be a car, a truck, an SUV, a van, a semi, a tractor, a bus, a go-kart, or any other rolling platform without departing from the scope or intent of the present disclosure. The vehicle 10 is equipped with a thermal management system 12.

Figure 2:
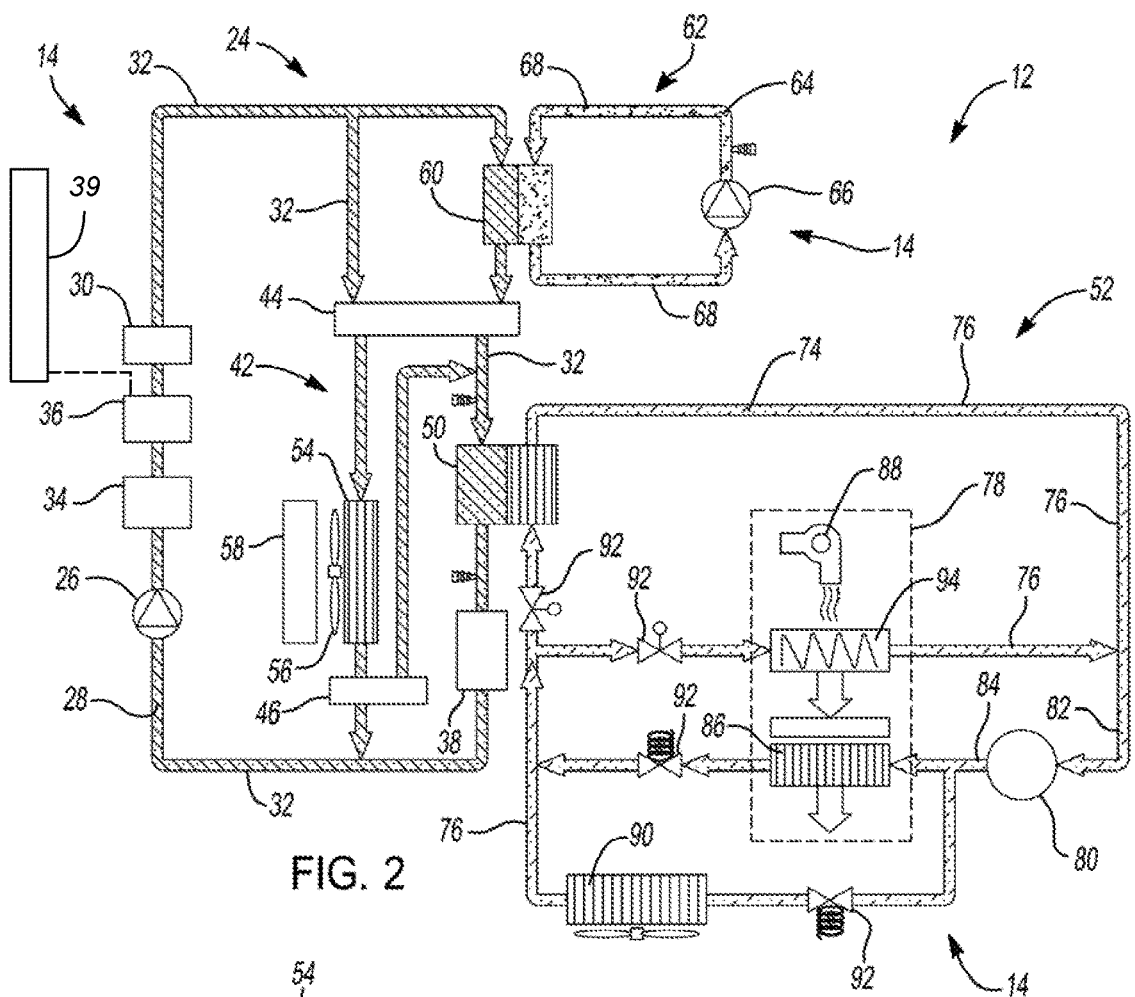
FIG. 2 is a schematic system diagram depicting a thermal management system for a motor vehicle, such as that shown in FIG. 1.

Referring also to FIG. 2, there is shown a schematic diagram of the thermal management system 12. In broad terms, the thermal management system 12 operates to selectively transport thermal energy from a heat source within the thermal management system 12 to a heat sink in the thermal management system 12, or from a heat source or a heat sink to a location within the thermal management system 12 where the thermal energy may be needed or used to improve function of the vehicle 10.

The thermal management system 12 includes a plurality of dissimilar thermal fluid loops 14 for various vehicle 10 sub-systems. Each of the dissimilar thermal fluid loops 14 has heat sources and heat sinks associated with one or more sub-systems of the vehicle 10. Some heat sinks are significantly more massive, and therefore, capable of storing more thermal energy, than other heat sinks. Accordingly, depending on the thermal energy storage capacities of various heat sinks within the thermal management system 12, thermal energy may be moved from one of the dissimilar thermal fluid loops 14 to another.

While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

When used herein, the term "substantially" refers to relationships that are, ideally perfect or complete, but where manufacturing realties prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans would recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

The vehicle 10 may circulate or transfer thermal energy via a reduced number of thermal fluid loops 14 in comparison to other approaches. In the example illustrated in FIGS. 1 and 2, the vehicle 10 circulates thermal energy generated onboard the vehicle only via the three fluid loops 14. In other words, the thermal requirements for the vehicle 10, i.e., any needs for heating or cooling of vehicle 10 components, as well as heating or cooling of the passenger compartment, may be met using only the three thermal fluid loops 14. Thermal energy may be transferred via the thermal fluid loops 14 by way of conduction, convection, or any other heat transfer mechanism. As used herein, cooling refers to reducing the current temperature of the referenced component or system, and heating refers to increasing the temperature of the referenced component or system.

A control system or controller 16 is in communication with a plurality of actuators, valves, and the like, and manages the operation of the thermal management system 12, including the plurality of dissimilar thermal fluid loops 14. The controller 16 is a non-generalized, electronic control device having a preprogrammed digital computer or processor 18, a memory or non-transitory computer readable medium 20 used to store data such as control logic, instructions, lookup tables, etc., and a plurality of input/output peripherals or ports 22. The processor 18 is configured to execute the control logic or instructions described herein.

The controller 16 may have additional processors or additional integrated circuits in communication with the processor 18 such as logic circuits for analyzing thermal management data. In some examples, the controller 16 may be a plurality of controllers 16, each of which is designed to interface with and manage specific componentry within the vehicle 10, and each of the plurality of controllers 16 is in electronic communication with the others. However, while in some examples more than one controller 16 may be used, for ease of understanding, the following description will describe the thermal management system 12 as having only one controller 16. The controller 16 may be dedicated to the thermal management system 12 or may be part of a larger control system or other functions of the vehicle 10.

Referring to both FIGS. 1 and 2, a first of the dissimilar thermal fluid loops 14 is a coolant loop 24. The coolant loop 24 includes a coolant pump 26 selectively pumping coolant 28 through a plurality of coolant conduits 32. The coolant conduits 32 are in fluid communication with a variety of components of the coolant loop 24. In some aspects, the coolant loop 24 includes an integrated power electronics (IPE) module 34. The IPE 34 is an electronic device having a variety of accessories usable by an operator of the vehicle 10.

In some instances, the IPE 34 includes one or more of an AC/DC converter (not shown), a high voltage supply (not shown), a navigation system (not shown), a high voltage charger (not shown), a heated seat system (not shown), and/or other like devices and features. As the IPE 34 is operated, the electronics within the IPE 34 convert electrical energy into a variety of functions usable by the operator. In addition, thermal energy is generated as a byproduct of using electrical energy within the IPE 34 devices. The coolant 28 carries the thermal energy from the IPE 34 devices elsewhere in the coolant loop 24.

The coolant loop 24 further includes an onboard charging module (OBCM) 36 for a battery 38. The OBCM 36 is an electrical device designed to move energy into a secondary cell or rechargeable battery 38 by forcing an electrical current through the battery 38. In some examples, a single-phase 3.5 kW to 22 kW OBCM 36 is installed within the electrical system of the vehicle 10 and charges the vehicle 10 and the battery 38 from an outside power source 39.

The outside power source 39 may be, for example and without limitation, a connection to a power grid, to a generation device (such as a gas generator), a storage battery (such as those used with solar or wind power systems), or other power supply delivering electric energy to the vehicle 10. Depending on the outside power source 39, the amount of time needed to charge the battery 38 may vary. For example, fast chargers may be able to fully charge the battery 38 in less than one hour, while chargers working off of standard home (110 volt or 240 volt) wiring may take longer.

In some configurations of the vehicle 10, the battery 38 can be used as an energy source, and therefore, the OBCM 36 can also direct electrical energy to the electrical grid, or to accessory or ancillary devices within the vehicle 10. In addition, the OBCM 36 can also direct electrical energy to devices, such as cellular phones, and the like that an operator of the vehicle 10 may power from electrical connections within the IPE 34 of the vehicle 10.

Therefore, the OBCM 36 may be a bi-directional battery charging and discharging device. In many instances, the battery 38 is most efficiently charged when the battery 38 is heated to a predetermined target temperature. In one aspect, the predetermined target temperature is approximately 25°

Celsius. However, depending on the componentry and the thermal requirements of the thermal management system 12, the predetermined target temperature of the battery 38 may vary. In one example, to achieve the target temperature range, the battery 38 can be heated electrically via electrical energy supplied by the OBCM 36. In that example, the controller 16 effectively overdrives the OBCM 36 or drives the OBCM 36 in a calculatedly inefficient manner, such as off-phasing, so as to convert a predetermined amount of electrical energy from the outside power source 39 into thermal energy, e.g., to raise the temperature of the battery 38.

In another example, the battery 38 itself is charged in a calculatedly inefficient manner. That is, the battery 38 is charged inefficiently so that a portion of the electrical energy being driven into the battery 38 by the OBCM 36 is converted into thermal energy, which is then stored within the mass of the battery 38 while the battery 38 is being charged. In yet another example, thermal energy is directed to the battery 38 via coolant 28 carried by the coolant loop 24 from other heat sources within and external to the coolant loop 24. The coolant loop 24 may include a coolant heater 30. The coolant heater 30 is an electrically powered heater, such as a resistive heater, that adds thermal energy to the flow of coolant 28. In some examples, once the battery 38 has been electrically charged sufficiently, the temperature of the battery 38 is regulated by the OBCM 36.

In configurations, the vehicle 10 includes a braking system 37 having a regeneration function. In vehicles 10 having regenerative braking systems, an electric motor 40 is used as an electric generator. Electricity generated by the electric motor 40 is fed back into the battery 38 by the OBCM 36. In some battery electric and hybrid vehicles, the energy is also stored in a bank of capacitors (not shown), or mechanically in a rotating flywheel (not shown). Under circumstances when the controller 16 and OBCM 36 determine that the battery 38 is fully charged or additional heating is otherwise desired, the electricity generated by the electric motor 40 can be converted into thermal energy and stored in the mass of the battery 38, other components of the thermal management system 12, or may be dissipated to the ambient air by the thermal management system 12.

Figure 3:
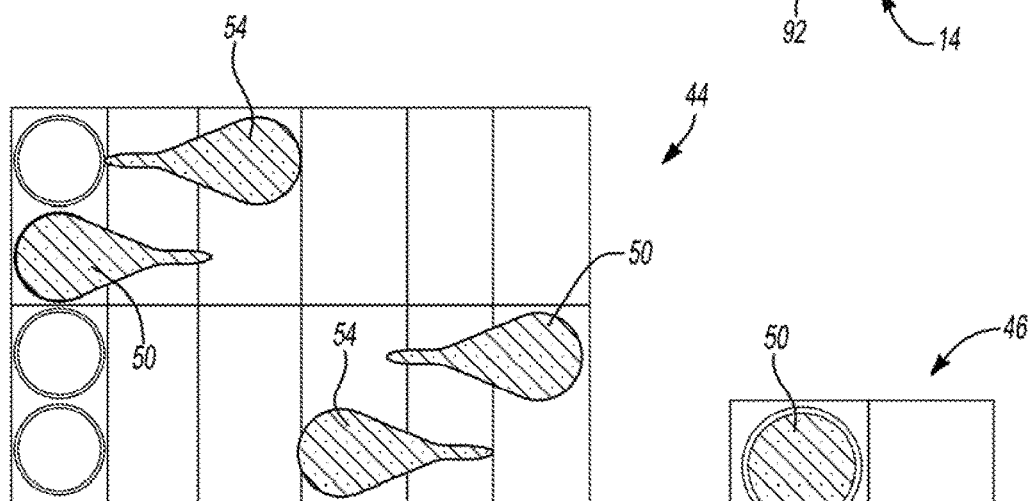
FIG. 3 is a schematic first valve diagram depicting opening and closing states for a plurality of valves within a thermal management system, such as that shown in FIG. 2.
Figure 4:
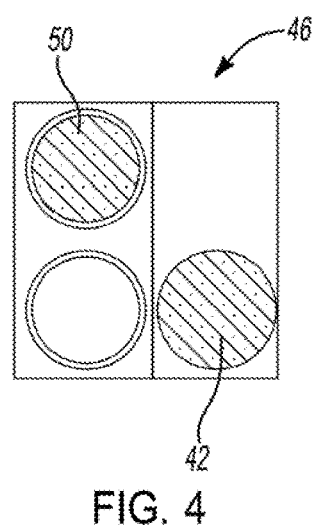
FIG. 4 is a schematic second valve diagram depicting opening and closing states for a valve within a thermal management system, such as that shown in FIG. 2.

Referring also to FIGS. 3 and 4, and with continuing reference to FIGS. 1 and 2, there are shown additional views of components of the thermal management system 12. To maintain control over the temperature of the battery 38, in some examples, the coolant loop 24 includes a battery bypass 42. In general terms, the battery bypass 42 is operable to selectively provide flow of the coolant 28 through the battery 38 or to bypass the battery 38 under a predetermined set of conditions. For example, the battery bypass 42 is set in a closed position when temperature of the battery 38 is below the preferred temperature of the battery 38. In such an example, the coolant 28 flows through the battery 38 and imparts thermal energy to the battery 38 from the OBCM 36, the coolant heater 30, and other components of the thermal management system 12.

In another example, the battery bypass 42 is set in an open position when the battery temperature is above the optimal battery 38 temperature. In the second example, coolant 28 flow is directed away from the battery 38. The controller 16 manages or directs the flow of coolant 28 through the battery bypass 42 by way of at least a first bypass valve 44 and a second bypass valve 46. The first bypass valve 44 operates to selectively direct the flow of coolant 28 past a second of the dissimilar thermal fluid loops 14, namely around a drive unit 48 disposed in a drive unit oil loop 62. The drive unit 48 provides torque to move the vehicle 10. The second bypass valve 46 operates to selectively direct the flow of coolant 28 around a third of the dissimilar thermal fluid loops 14, namely around a chiller 50 of a refrigerant loop 52. Depending on the requirements of the thermal management system 12, the first bypass valve 44 and the second bypass valve 46 may be variable force solenoids (VFS) or valves, variable bleed solenoids (VBS) or valves, or binary or mode control solenoids or valves, merely as examples.

In the example of FIG. 3, the first bypass valve 44 is of the VFS or VBS type. Thus, the first bypass valve 44 is configured to be varied along a continuous spectrum between a fully closed state and opened state. In the fully closed state, the first bypass valve 44 prevents all coolant 28 flow incident upon an inlet of the first bypass valve 44 from flowing through the first bypass valve 44 to an outlet of the first bypass valve 44. By contrast, in the fully opened state, the first bypass valve 44 will provide all coolant 28 flow incident upon the inlet of the first bypass valve 44 to the outlet of the first bypass valve 44. The first bypass valve 44 should be understood to vary the valve opening in accordance with the coolant 28 flow demands of the thermal management system 12.

In FIG. 3, and with reference to FIG. 2, the upper half of the valve diagram depicts a situation in which the drive unit 48 is receiving thermal energy from the coolant 28 via a heat exchange device, such as a transmission oil cooler (TOC) 60. The upper half of the valve diagram shows that the first bypass valve 44 is providing a variable amount of flow through a radiator 54 and the chiller 50 while also providing coolant 28 to the TOC 60. In the bottom half of the valve diagram in FIG. 3, the valve diagram shows a situation in which the first bypass valve 44 is shunting coolant 28 away from the TOC 60, thereby bypassing heat exchange with the drive unit oil loop 62 entirely. However, the first bypass valve 44 still provides variable flow through the radiator 54 and the chiller 50.

In the example of FIG. 4, and with continued reference to FIGS. 1 and 2, the second bypass valve 46 is of the binary or mode control variety. That is, the second bypass valve 46 is a binary valve having only fully open and fully closed states. In the fully closed state, the second bypass valve 46 prevents all coolant 28 flow incident upon an inlet of the second bypass valve 46 from flowing through an outlet of the second bypass valve 46. By contrast, in the fully opened state, the second bypass valve 46 will provide all coolant 28 flow incident upon the inlet of the second bypass valve 46 to the outlet of the second bypass valve 46.

The second bypass valve 46 should be understood to operate in open or closed states in accordance with the coolant 28 flow demands of the thermal management system 12, as directed by the controller 16. In the upper half of the valve diagram of FIG. 4, the second bypass valve 46 of FIG. 4 is depicted in a closed state in which coolant 28 flow is provided to the chiller 50. In the bottom half of the valve diagram of FIG. 4, in the open state, the second bypass valve 46 directs coolant 28 to bypass the chiller 50 and the battery 38 as well, thereby forming part of the battery bypass 42. Thus, when the second bypass valve 46 is open, coolant 28 flows from the second bypass valve 46 directly into the coolant conduits 32 leading to the coolant pump 26.

In some configurations, the first bypass valve 44 and second bypass valve 46 selectively direct the flow of coolant 28 through the radiator 54. The radiator 54 exchanges thermal energy between the coolant 28 and the atmosphere external to the vehicle 10. Thus, when the radiator 54 is used, thermal energy is rejected from the vehicle 10. In some configurations, the radiator 54 operates in conjunction with a fan 56 and an airflow management device, such as a shutter mechanism 58 operable to precisely regulate the temperature of the radiator 54 and, therefore, the coolant 28 passing through the radiator 54.

In some configurations, the shutter mechanism 58 is a series of vanes or flaps disposed in an orifice (not shown) on an exterior surface of the vehicle 10, such as a front, side, underside or top-side-facing air intake (not shown), or an intake disposed within a foglamp housing (not shown), or the like. The vanes or flaps of the shutter mechanism 58 are moved through a range of motion that provides at least an open position and a closed position. In several aspects, the controller 16 can variably alter the position of the shutter mechanism 58 electromechanically by way of solenoids, motors, actuators, and the like, hydraulically, by aerodynamic forces, or any combination of the above. In the open position, airflow incident upon the shutter mechanism 58 is allowed to pass through the shutter mechanism 58 toward the radiator 54 and/or the fan 56. In the closed position, airflow incident upon the shutter mechanism 58 is prevented from passing through to the radiator 54 and/or the fan 56.

While shutter mechanism 58 has been described herein as having open and closed positions, it should be understood that the shutter mechanism 58 may be manipulated variably into any position between fully open and fully closed as well. Thus, the controller 16 can manipulate the shutter mechanism 58 precisely to provide and modulate airflow to the radiator 54 when such airflow is desirable, and to prevent such airflow when no airflow is needed. In some examples, the controller 16 commands the shutter mechanism 58 to remain closed under a wide range of drive cycle conditions, thereby minimizing thermal energy rejection to the atmosphere via the radiator 54.

In further examples, the first bypass valve 44 and second bypass valve 46 variably direct the flow of coolant 28 through both the battery 38 and the radiator 54, as illustrated in FIG. 3, thereby providing the coolant loop 24 with the ability to precisely thermoregulate the battery 38 and other components within the coolant loop 24.

The first bypass valve 44 selectively directs flow of the coolant 28 through the battery 38 and/or through the TOC 60 disposed in the second of the dissimilar thermal fluid loops 14, namely, the drive unit oil loop 62. The TOC 60 is a heat exchange device providing a means of thermal energy transfer between the coolant loop 24 and the drive unit oil loop 62. The TOC 60 includes at least two passageways physically separated from one another. That is, on a first side of the TOC 60, a coolant 28 passageway (not shown) carries coolant 28 through the TOC 60 as a part of the coolant loop 24. On a second side of the TOC 60, an oil passageway (not shown) carries oil 64 through the TOC 60 as a part of the drive unit oil loop 62. However, it should be understood that despite the fact that the TOC 60 includes both a portion of the coolant loop 24 and the oil loop 62, there is no fluid interface between coolant 28 and oil 64 within the TOC 60, and thus the coolant 28 and oil 64 are prevented from mixing.

An oil pump 66 pumps the lubricating oil 64 through a plurality of oil conduits 68 in fluid communication with the drive unit 48. The drive unit 48 is a plurality of mechanical devices that convert chemical or electrical energy into torque to motivate the vehicle 10.

In some configurations, the mechanical devices include an engine 70 and a transmission 72. The engine 70 may be an internal combustion engine (ICE), an electric motor 40, and/or any other type of prime mover without departing from the scope or intent of the present disclosure. In some aspects, the engine 70 operates in conjunction with, or may be replaced entirely by at least one electric motor 40. The engine 70 and/or the electric motor 40 provide torque that moves the vehicle 10 via the transmission 72.

The transmission 72 may be a manual, automatic, multi-clutch, or continuously variable transmission, or any other type of electronically, pneumatically, and/or hydraulically-controlled automotive transmission 72 without departing from the scope or intent of the present disclosure. The transmission 72 is mechanically and/or fluidly coupled to the engine 70. The drive unit oil loop 62 circulates the oil 64 throughout the transmission 72, thereby keeping the internal components of the transmission 72 lubricated. In some aspects, the transmission 72 and the engine 70 share a supply of oil 64 via the oil loop 62. Moreover, in some examples, the circulating oil 64 is used to heat or warm the transmission 72 during startup of the engine 70 or to cool the transmission 72 as necessary during heavy use.

The drive unit 48 has a predetermined optimal operating temperature at which the lubricating oil 64 has desirable viscosity and lubrication characteristics. In several aspects, the predetermined optimal operating temperature is approximately 70° Celsius. However, depending on the application and the components of the drive unit 48 and in the drive unit oil loop 62, the optimal operating temperature may vary substantially. For example, in drive units 48 having an internal combustion engine 70, the optimal oil 64 temperature circulating through the engine 70 is between about 85° Celsius and about 120° Celsius. In another example, in drive units 48 having an automatic transmission 72, the optimal temperature of the oil 64 circulating through the automatic transmission 72 may be between about 20° Celsius and about 110° Celsius. In still another example, in drive units 48 having an automatic transmission 72 coupled to a torque converter (not shown), the temperature of oil 64 circulating through the torque converter may be between about 90° and about 180° Celsius.

Referring once more to FIG. 4 and with continuing reference to FIGS. 1-3, the second bypass valve 46 selectively directs flow of the coolant 28 through the battery 38 and/or through the chiller 50 disposed in the third of the dissimilar thermal fluid loops 14, in particular, the refrigerant loop 52. The chiller 50 is a heat exchange device providing a means of thermal energy transfer between the coolant loop 24 and the refrigerant loop 52. However, like the TOC 60, the chiller 50 includes at least two passageways physically separated from one another. That is, on a first side of the chiller 50, a coolant 28 passageway (not shown) carries coolant 28 through the chiller 50 as a part of the coolant loop 24. On a second side of the chiller 50, a refrigerant passageway (not shown) carries a refrigerant 74 through the chiller 50 as a part of the refrigerant loop 52. However, it should be understood that despite the fact that the chiller 50 includes both a portion of the coolant loop 24 and the refrigerant loop 52, there is no fluid interface between coolant 28 and refrigerant 74 within the chiller 50, and thus the coolant 28 and refrigerant 74 are prevented from mixing.

The refrigerant loop 52 includes a plurality of refrigerant conduits 76 fluidly connecting a plurality of devices operable to thermally regulate a passenger compartment (not specifically shown) contained within the vehicle 10. The passenger compartment may be thermally isolated from other vehicle components generating heat, and may receive flows of thermal energy via one or more vents or other conduits (not specifically shown) of a heating, ventilation, and air conditioning (HVAC) system 78. The refrigerant loop 52 also carries thermal energy to and from the coolant loop 24 via the chiller 50. The refrigerant loop 52 includes a variety of operator comfort systems such as the HVAC system 78.

Fundamentally, the refrigerant loop 52 has a heating function and a cooling function. Within the refrigerant loop 52, the HVAC system 78 provides heated and/or cooled air to a passenger compartment of the vehicle 10. Stated another way, the HVAC system 78 transports thermal energy from a cooler location to a warmer location within the refrigerant loop 52. In several aspects, the HVAC system 78 functions as a heat pump. That is, the HVAC system 78 is an air conditioner in which both heating and cooling functions are possible.

In one example, the operator of the vehicle 10 determines a desired passenger compartment air temperature and selects a heating cycle for the HVAC system 78. The HVAC system 78 includes a compressor 80. The refrigerant 74 enters the compressor 80 via the refrigerant conduit 76, which may be known as a suction line 82. The compressor 80 compresses gaseous refrigerant 74, thereby increasing the temperature and pressure of the refrigerant 74. The now high-pressure, high-temperature refrigerant 74 then leaves the compressor 80 via a refrigerant conduit 76 known as a discharge line 84 and flows into a cabin condenser 86. In some aspects, the cabin condenser 86 is a heat exchange device having a plurality of condenser coils through which the refrigerant 74 flows. The coils are in contact with the passenger compartment atmosphere. An HVAC blower or fan 88 blows air over the cabin condenser 86, thereby releasing thermal energy from the condenser 86 into the passenger compartment atmosphere. In some aspects, the refrigerant loop 52 includes a second or exterior condenser 90. The exterior condenser 90 is in contact with the ambient atmosphere external to the vehicle 10 and when engaged, releases thermal energy from the refrigerant 74 from the vehicle 10 to the atmosphere.

The HVAC system 78 further includes a plurality of expansion valves 92. Depending on the HVAC system 78 design parameters or characteristics, the expansion valves 92 may be mechanical thermostatic expansion valves (TXV) (not specifically shown) and/or electronic expansion valves (EXV) (not specifically shown). Control over the rate of refrigerant 74 expansion may be more directly and precisely controlled with EXVs than with TXVs, however in some cases it is desirable to use TXVs for reasons of cost, simplicity, and the like. Condensed, pressurized, and still somewhat warm refrigerant 74 received from the cabin condenser 86 and/or exterior condenser 90 is routed through an expansion valve 92. As the refrigerant 74 is de-pressurized by the expansion valve 92, the refrigerant 74 cools. The refrigerant 74 then passes through an evaporator 94. The evaporator 94 is a heat exchange device in which a series of refrigerator coils (not shown) carry a flow of cooled refrigerant 74.

The refrigerator coils exchange thermal energy with the passenger compartment atmosphere. The HVAC blower or fan 88 blows air over the cabin evaporator 94 thereby cooling the passenger compartment of the vehicle 10. The refrigerant 74, having passed through the evaporator 94 is then directed back through the compressor 80. Refrigerant 74 is also selectively passed through an expansion valve 92 to the chiller 50, where thermal energy is either obtained from or released to the coolant loop 24, depending on the relative temperatures of the coolant 28 and the refrigerant 74, and the thermal requirements of the battery 38 and other thermal management system 12 componentry.

In some configurations, the HVAC system 78 can be operated intermittently or continuously by occupants in the passenger compartment, or by the controller 16 depending on optimal heating and/or cooling requirements of the passenger compartment, or optimal heating and/or cooling requirements of other components of the thermal management system 12. The HVAC system 78 may operate continuously as a heat pump. As previously discussed, while operating as a heat pump, the HVAC system 78 directs refrigerant 74 through the cabin condenser 86, thereby rejecting the thermal energy in the refrigerant 74 to the passenger compartment and cooling the refrigerant 74. However, because the refrigerant loop 52 exchanges thermal energy with the coolant loop 24 in the chiller 50, a temperature of the refrigerant 74 in the refrigerant loop 52 remains substantially above the freezing point of water. That is, the refrigerant 74 continuously exchanges thermal energy with the coolant 28, and with the oil 64 in the oil loop 62 via the coolant 28 in the coolant loop 24.

Therefore, while refrigerant 74 is passing through the cabin condenser 86 and the exterior condenser 90 rejects thermal energy, and is cooled, thermal energy is also obtained as the refrigerant 74 passes through the chiller 50. Thus, because the temperature of the refrigerant 74 remains substantially above the freezing point of water, the cabin condenser 86 remains substantially free of ice accumulation. Similarly, in a second example, the controller 16 directs refrigerant 74 through the exterior condenser 90 where the refrigerant 74 is cooled by rejecting thermal energy to the atmosphere, but because the refrigerant 74 also flows through the chiller 50, a temperature of the refrigerant 74 remains substantially above the freezing point of water.

Therefore, in both the first and second examples, ice is prevented from forming on both the cabin condenser 86 and exterior condenser 90 even if one, the other, or both the cabin condenser 86 and exterior condenser 90 are used continuously. Moreover, even if ice does begin to accumulate on the cabin condenser 86 or exterior condenser 90, the controller 16 directs thermal energy from one of the thermal energy reservoirs in the oil loop 62 or the coolant loop 24 to the chiller 50, and using the expansion valves 92, through the cabin condenser 86 and/or exterior condenser 90, thereby melting any accumulation of ice as needed Referring also to FIGS. 5A-D, there are shown schematic charts or graphs illustrating thermal management strategies for selectively cooling the battery 38. The strategies discussed with respect to FIGS. 5A-D may extend driving range of the vehicle 10 and shelf life of the battery 38.

Figure 5A:
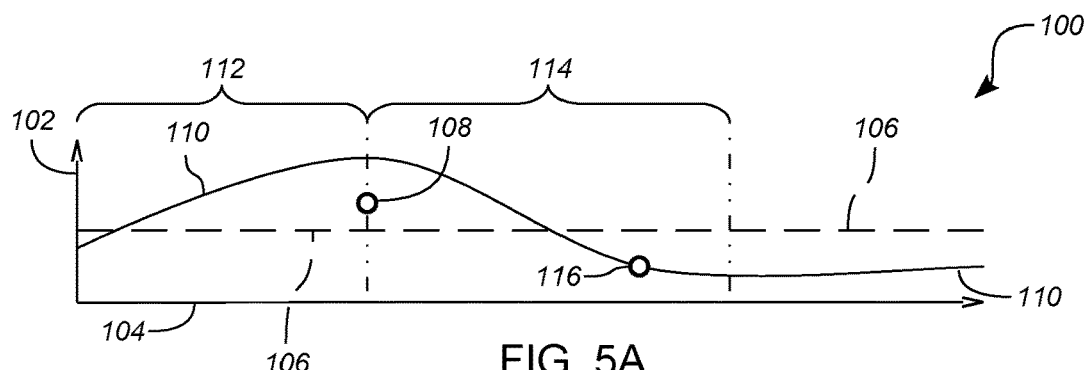

FIG. 5A shows a graph 100 illustrating active cooling of the battery 38 during driving or following driving. The graph 100 shows tracking the temperature of the battery 38 and selectively cooling the battery 38 based on current and historical operating temperatures. Battery temperature 102 is shown on the vertical axis and time 104 is shown on the horizontal axis.

A target lifetime battery temperature (TLBT) 106 represents a determined preferred average temperature of the lifetime of the battery 38. The TLBT 106 is vehicle specific, and represents an estimate of the average operating temperature that will allow the battery 38 to reach its planned shelf life. In very general terms, the lower the operating temperatures of the battery 38, the longer the battery 38 will last.

The graph 100 also illustrates an actual average battery temperature (AABT) 108, which is the historical average operating temperature of the battery 38 on each specific vehicle 10. The AABT 108 may be determined by the controller 16. The controller 16 is also tracking a current battery temperature (CBT) 110. The stored data of the CBT 110 may be used to determine or calculate the AABT 108. The controller 16 is configured to compare the calculated actual average battery temperature to the TLBT 106. This comparison shows whether the vehicle 10 has been operating above or below the preferred temperature range of the TLBT 106.

As shown in FIG. 5A, a determination period or initiation period 112 occurs after the vehicle 10 begins driving. The length of the initiation period 112 may be set based on specific characteristics of the vehicle 10, may be based on changes to the CBT 110 (e.g., the initiation period 112 lasts for 5 degrees Celsius change in the temperature of the battery 38), or may be based on driving distance or time. Following the initiation period 112 is an active period 114, during which the controller 16 determines whether active battery cooling is needed. Note that the active period 114 may occur after the vehicle 10 has stopped driving and is connected to the outside power source 39.

In the example shown in FIG. 5A, the controller 16 calculates that the AABT 108 is greater than the TLBT 106. Therefore, during the active period 114, the controller 16 cools the battery 38 to a target battery temperature 116. Depending on the configuration of the vehicle 10, the target battery temperature 116 may be below the TLBT 106, but the battery 38 will at least be cooled from the peak CBT 110 when the active cooling began.

If the active period 114 occurs while the vehicle 10 is being driven, or while the vehicle 10 is stopped but not connected to the outside power source 39, then the energy used to cool the battery 38 will come from stored energy and will reduce the driving range of the vehicle 10. It is generally preferable to maximize the available range of the vehicle 10. If the active period 114 occurs entirely while the vehicle 10 is not being driven and is connected to the outside power source 39, then the energy to cool the battery 38 will come from the outside power source 39. Note however, that it is generally preferable to minimize use of power from the outside power source 39, in order to reduce cost and reduce generation of carbon.

The controller 16 may determine or calculate the target battery temperature 116 with physics-based algorithms, which are specific to the vehicle 10 and may be determined through testing, modeling, or both. For example, and without limitation, target battery temperature 116 may be a function of one or more of: average battery temperature (such as the AABT 108); actual battery temperature (such as the CBT 110); ambient temperature; mass of the battery 38; learned or predicted driving cycle; and charging power of the outside power source 39, or other charging sources, in addition to the thermal capacity of the battery 38.

The temperature of the battery 38 may be affected by the needs and operating conditions of the vehicle 10. For example, and without limitation: propulsion needs of the vehicle 10 generate thermal energy (propulsion thermal); cabin heating and cooling generates thermal energy (cabin thermal); and charging or discharging the battery 38 creates thermal energy (battery thermal).

In one configuration, Target Battery Temperature=Normal Propulsion Battery Minimum Temperature+(Cabin Energy Usage Rate*Predicted Drive Time/(Battery Thermal Capacity*Mass)/Loss Function). The loss function is determined by the difference between the normal propulsion battery minimum and the ambient temperatures, because heat will dissipate to the ambient environment. With a cabin temperature setting of 72 degrees Celsius, an expected drive time of 30 minutes, and an ambient temperature of negative 10 degrees Celsius, the target temperature for the battery 38 (having mass of about 500 kg) may be approximately 25 degrees Celsius.

Figure 5B:
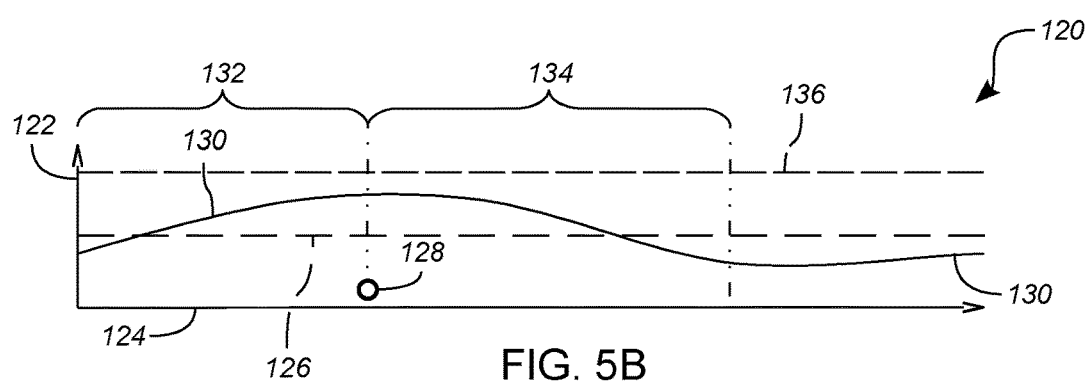

FIG. 5B shows a graph 120 illustrating delayed cooling of the battery 38 during driving or following driving. Battery temperature 122 is shown on the vertical axis and time 124 is shown on the horizontal axis. Similar to the graph 100 of FIG. 5A, a target lifetime battery temperature (TLBT) 126 shows the preferred average temperature of the lifetime of the battery 38, and an actual average battery temperature (AABT) 128 shows the historical average operating temperature of the battery 38 on that vehicle 10. The controller 16 is also tracking a current battery temperature (CBT) 130.

A determination period or initiation period 132 occurs after the vehicle 10 begins driving, and an active period 134 follows the initiation period 132. Note that the active period 134 may occur while the vehicle 10 is driving or after the vehicle 10 has stopped driving and is connected to the outside power source 39.

The controller 16 is configured to compare the calculated AABT 128 to the TLBT 126. This comparison shows whether the vehicle 10 has been operating above or below the preferred temperature range of the TLBT 126.

In the example shown in FIG. 5B, the controller 16 calculates that the AABT 128 is less than the TLBT 126. Therefore, during the active period 134, the controller 16 determines that it does not, yet, need to actively lower the temperature of the battery 38 to below the TLBT 126. The controller 16 delays battery 38 cooling based on algorithms incorporating the AABT 128. Note that in other configurations of the vehicle 10, the controller 16 would often cool the battery 38 toward the TLBT 126 whenever the CBT 130 is greater than the TLBT 126.

In the example of FIG. 5B, about half of the active period 134 occurs while the vehicle 10 is being driven, and the remainder occurring after the vehicle 10 is stopped. The CBT 130 begins to naturally decrease after the vehicle 10 is no longer being driven. Therefore, the CBT 130 does not remain indefinitely above the TLBT 126, which reduces consumption of energy, whether stored in the battery 38 or from the outside power source 39, to cool the battery 38.

FIG. 5B also demonstrates a maximum limit temperature 136, which may be determined based on individual characteristics of the battery 38 and the vehicle 10. Irrespective of the AABT 128, if the CBT 130 rises to the maximum limit temperature 136, the controller 16 may use energy to actively cool the battery 38. The maximum limit temperature 136 represents a level beyond which the battery 38 may degrade, or beyond which the shelf life may be affected, regardless of the AABT 128.

In some configurations, the controller 16 may adjust or calculate that maximum limit temperature 136 based, at least in part, on the AABT 128, such that when the vehicle 10 has a very low AABT 128, the maximum limit temperature 136 may be set higher. In such configurations, there may also be an absolute limit, beyond which the controller 16 never allows the temperature of the battery 38 to increase.

Furthermore, the controller 16 may adjust the maximum limit temperature 136 based, at least in part, on the state of charge (SOC) of the battery 38. For example at lower states of charge, the controller 16 may increase the maximum limit temperature 136, and at higher states of charge the controller 16 may decrease the maximum limit temperature 136. Further discussion of how the state of charge may effect the operating temperatures selected by the controller 16 may be found in U.S. Pat. No. 9,376,031, which is hereby incorporated by reference in its entirety. The exact determination of the maximum limit temperature 136 relative to different states of charge may be a physics-based calculation that is specific to the vehicle 10 and its components.

Figure 5C:
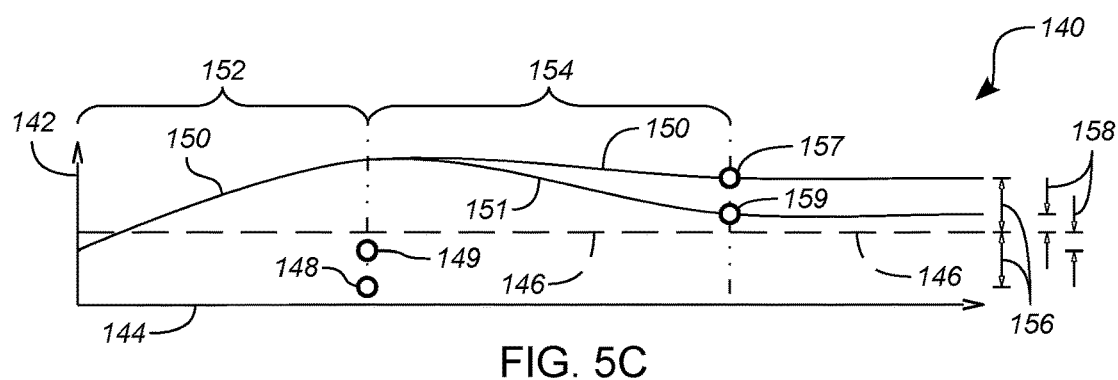

FIG. 5C shows a graph 140 illustrating two examples of active battery cooling while driving based on differentials between target and actual average lifetime battery temperature during driving. Battery temperature 142 is shown on the vertical axis and time 144 is shown on the horizontal axis. A target lifetime battery temperature (TLBT) 146 shows the preferred average temperature of the lifetime of the battery 38.

FIG. 5C illustrates two different vehicle driving histories, in order to illustrate two different active cooling levels. The figure may illustrate two different vehicles 10 or the same vehicle 10 at different times during its driving life. Therefore the graph 140 includes a first actual average battery temperature (first AABT) 148 and a second actual average battery temperature (second AABT) 149. Note that the first AABT 148 is significantly lower than the TLBT 146, while the second AABT 149 is lower than, but nearer to, the TLBT 146.

The controller 16 is also tracking a first current battery temperature (first CBT) 150 and a second current battery temperature (second CBT) 151. A determination period or initiation period 152 occurs after the vehicle 10 begins driving, and an active period 154 follows the initiation period 152. During the initiation period 152, the first CBT 150 and the second CBT 151 are substantially the same, such that both situations begin in similar fashion.

At the active period 154, the controller 16 compares the calculated first AABT 148 and the first CBT 150 to the TLBT 146. As shown in graph 140, the first CBT 150 is well above the TLBT 146 and the first AABT is well below the TLBT 146. In this configuration, the controller 16 decides to actively cool the battery 38, but not all of the way to the TLBT 146.

The controller 16 calculates a first differential 156 between the first AABT 148 and the TLBT 146. Then, the controller 16 actively cools the battery 38 until the first CBT 150 reaches a first target temperature 157 approximately equal to the TLBT 146 plus the first differential 156. As such, the controller 16 is cooling the battery 38 toward the TLBT 146, but not all the way, as offset by the specific first differential 156. This effectively makes the resulting operating temperature of the first CBT 150 balance around the TLBT 146, such that the first AABT 148 will tend to move toward the TLBT 146 under steady state operation.

The controller 16 also calculates a second differential 158 between the second AABT 149 and the TLBT 146. Then, the controller 16 actively cools the battery 38 until the second CBT 151 reaches a second target temperature 159 that is approximately equal to the TLBT 146 plus the second differential 158. As such, the controller 16 is cooling the battery 38 toward the TLBT 146, but not all the way, as offset by the situation-specific second differential 158. This effectively makes the resulting operating temperature of the second CBT 151 balance around the TLBT 146, such that the second AABT 149 will tend to move toward the TLBT 146 under subsequent steady state operation.

By using a target temperature that is offset from the TLBT 146 by the first differential 156 or the second differential 158, the vehicle 10 is saving energy over cooling to the TLBT 146. However, the target operating temperatures are contributing to an average temperature that is equal to the TLBT 146.

Figure 5D:
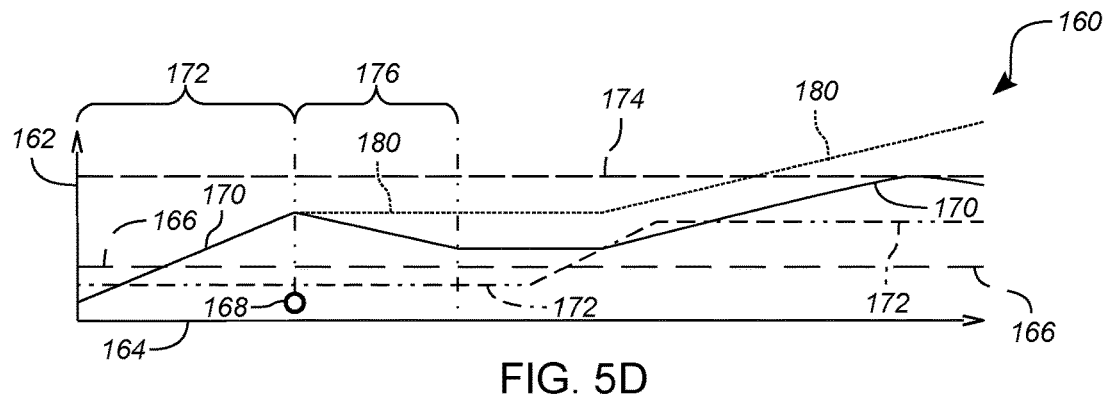

FIG. 5D shows a graph 160 illustrating early cooling of the battery 38 based on a predicted drive cycle in which the temperature of the battery 38 is likely to increase in the future. Temperatures 162 are shown on the vertical axis and time 164 is shown on the horizontal axis. A target lifetime battery temperature (TLBT) 166 shows the preferred average temperature of the lifetime of the battery 38. The graph 160 shows an actual average battery temperature (AABT) 168, which is lower than the TLBT 166.

For the examples illustrated in FIGS. 5A-5C, the controller 16 was largely monitoring, and making decisions based upon, current and past operating conditions of the vehicle 10. FIG. 5D illustrates an example of the controller 16 also using predictive algorithms to estimate upcoming driving conditions and a future battery temperature of the vehicle 10. For example, the driver of the vehicle 10 may enter information of a driving route into a navigation system, such that the controller 16 knows where the vehicle 10 will be headed in the future, and may also estimate the times during which the vehicle 10 will enter specific areas or encounter specific driving conditions. Note that the driving route may contain both geographic and topographic information, such that the controller recognizes elevation changes along the route, in addition to the roads and areas through which the vehicle 10 will travel.

Alternatively, the controller 16 may predict the driving route based on prior history of the vehicle 10, such as regular commutes or patterned drive cycles. For example, the vehicle 10 may regularly be driven on generally flat ground during an initial portion of the drive cycle and then generally uphill for the remainder of the drive cycle. Uphill driving increases the propulsion thermal energy generated in the battery 38, such that the later portions of the drive cycle may increase the temperature of the battery 38 due to propulsion loads.

The controller tracks a current battery temperature (CBT) 170 for the battery 38 during, and after, the vehicle 10 drive cycle. An outside air temperature 172 represents the conditions around the vehicle during the drive. Note that the outside air temperature 172 may be different from the ambient temperature at the beginning of the drive, particularly when the vehicle 10 is parked in a conditioned garage. Therefore, the outside air temperature 172 may be determined based on communications networks and weather data.

Furthermore, the outside air temperature 172 may be estimated based on the predicted driving cycle or driving route. As shown in FIG. 5D, the outside air temperature 172 is predicted to increase during the later portion of the drive. This may occur, for example and without limitation, when the vehicle 10 begins its drive cycle in the morning and finishes in the afternoon, or when the vehicle drives from an area with low temperatures to an area with relatively higher temperatures. A maximum limit temperature 174 illustrates a level above which the CBT 170 should not go.

The outside air temperature 172 affects the CBT 170 by changing the ability of the battery 38 to expel heat to the air around the vehicle 10. Furthermore, as the outside air temperature 172 increases, additional energy may be required, via the HVAC system 78, to cool the cabin. As the battery 38 discharges energy for the HVAC system 78 to cool the cabin, thermal energy is released within the battery 38, such that the temperature of the battery 38 tends to increase. Therefore, as the predicted drive cycle for the vehicle 10 progresses, the controller 16 predicts that it will be more difficult to maintain the CBT 170.

As shown in FIG. 5D, the controller 16 implements active cooling of the battery 38 during a shift period 176. Note that during the shift period 176, there is no otherwise required cooling of the battery 38. The AABT 168 for the vehicle 10 is well below the TLBT 166, such that the controller 16 could have determined that no cooling was needed (as in the example of FIG. 5D) or that minimal cooling was needed (as in the example of FIG. 5C). Furthermore, the CBT 170 has not elevated to the maximum limit temperature 174, as of the beginning of the shift period 176.

However, without active cooling during the shift period 176, the temperature of the battery 38 would likely have increased beyond the maximum limit temperature 174, as illustrated by an un-shifted CBT 180. As shown in FIG. 5D, the future battery temperature would have moved beyond the maximum limit temperature 174. The shift period 176 implements active cooling during a time when the battery 38 is not yet at problematic temperature levels, but in response to a prediction that such levels may be reached later in the drive cycle.

Additionally, the controller 16 may analyze operating conditions of the vehicle 10 to determine whether it is more energy efficient to implement active cooling during the shift period 176 than a subsequent time period. This may be referred to as opportunity cooling, as it incorporates a determination of whether there is an opportunity to cool more efficiently now than in the future (when cooling will likely be needed). For example, as the outside air temperature 172 increases, the heat pump function of the HVAC system 78 may be less efficient at expelling thermal energy from the battery 38, via the coolant loop 24 and the chiller 50, to the environment. Additionally, as the outside air temperature 172 increases, the HVAC system 78 will also be needed to cool the cabin of the vehicle 10. Therefore, the range of the vehicle 10 may be extended by cooling the battery 38 during the shift period 176 as opposed to a later cooling period during which the HVAC system 78 would be less efficient.

When the controller 16 may be determining the efficiency, or ability, to cool the battery 38, this may be referred to as cooling cost. The controller 16 may also be using predicted route information to predict future cooling cost on the remainder of the drive. Therefore, the controller 16 may decide that it is more efficient to cool the battery 38 during an early portion of the drive, even though it would not otherwise do so, if the cooling cost is low during the early portion and expected to increase later in the drive cycle.

Cooling cost may be quantified by the coefficient of performance (COP), which varies based on the specific cooling systems used. For example, during the shift period 176, there may be relatively low cooling cost—i.e., the COP is between 10 and 25. However, later in the drive cycle, after the outside air temperature 172 increases and the un-shifted CBT 180 would have moved close to the maximum limit temperature 174, there may be relatively higher cooling cost—i.e., the COP is between 2.5 to 5. The controller compared the current COP to the predicted COP and enabled opportunity cooling during the lower COP. This reduces the amount of energy used to cool the battery 38 and extends driving range.

Additionally, note that the controller 16 may use predicted state of charge to vary the maximum limit temperature 174, such that the decision of whether to start cooling early—i.e., to implement that shift period 176—incorporates the predicted state of charge.

For example, if the predicted temperature rise for the battery 38 will be higher than the maximum limit temperature 174 at the predicted state of charge in the next 30 minutes, then the controller 16 will enable opportunity cooling during the shift period 176. However, if the predicted temperature rise for the battery 38 will be lower than the maximum limit temperature 174 at the predicted SOC in the next 30 minutes then the controller 16 may disable opportunity cooling.

As shown in FIG. 5D, the un-shifted CBT 180 would have increased well beyond the maximum limit temperature 174, which may have required very aggressive and/or inefficient cooling of the battery 38. However, with the active cooling during the shift period 176, the HVAC system 78 is not required to cool the battery 38 when the increased outside air temperature 172 makes cooling the battery 38 relatively more difficult. Later in the drive cycle, as the CBT 170 moves close to the maximum limit temperature 174, the controller 16 instructs additional active cooling to decrease the temperature of the battery 38.

Note that the specific mechanisms or techniques for cooling the battery 38 shown and discussed herein are not limiting, and that other structures and mechanisms may be used. For example, and without limitation, thermoelectric devices, dedicated coolant loops, air cooling, or combinations thereof, may be used for the methods of selectively cooling the battery 38 discussed herein.

When the controller 16 determines that the battery 38 should be actively cooled, such as the examples illustrated in FIGS. 5A, 5C, and 5D, the controller 16 may vary the aggressiveness of the cooling based on condition of the vehicle 10 and of the environment. The controller 16 may determine or calculate cooling aggressiveness with physics-based algorithms, which are specific to the vehicle 10 and may be determined through testing, modeling, or both. The cooling aggressiveness accounts both for the time of cooling and the amount of energy applied to cooling the battery 38.

Cooling aggressiveness may be a function of, for example and without limitation, one or more of the following inputs: forecast battery temperature, forecast battery thermal power generation, ambient temperature and humidity, forecast cabin thermal usage, and the current and predicted cooling effectiveness (as quantified by COP). The controller 16 determines cooling aggressiveness by calculating predicted energy savings by aggressively cooling now, as opposed to waiting and reactively cooling later. When the predicted reactive cooling power is significantly greater than the predicted aggressive cooling power, the system recognizes that it will cost less energy to cool aggressively, and to cool aggressively now.

Figure 6:
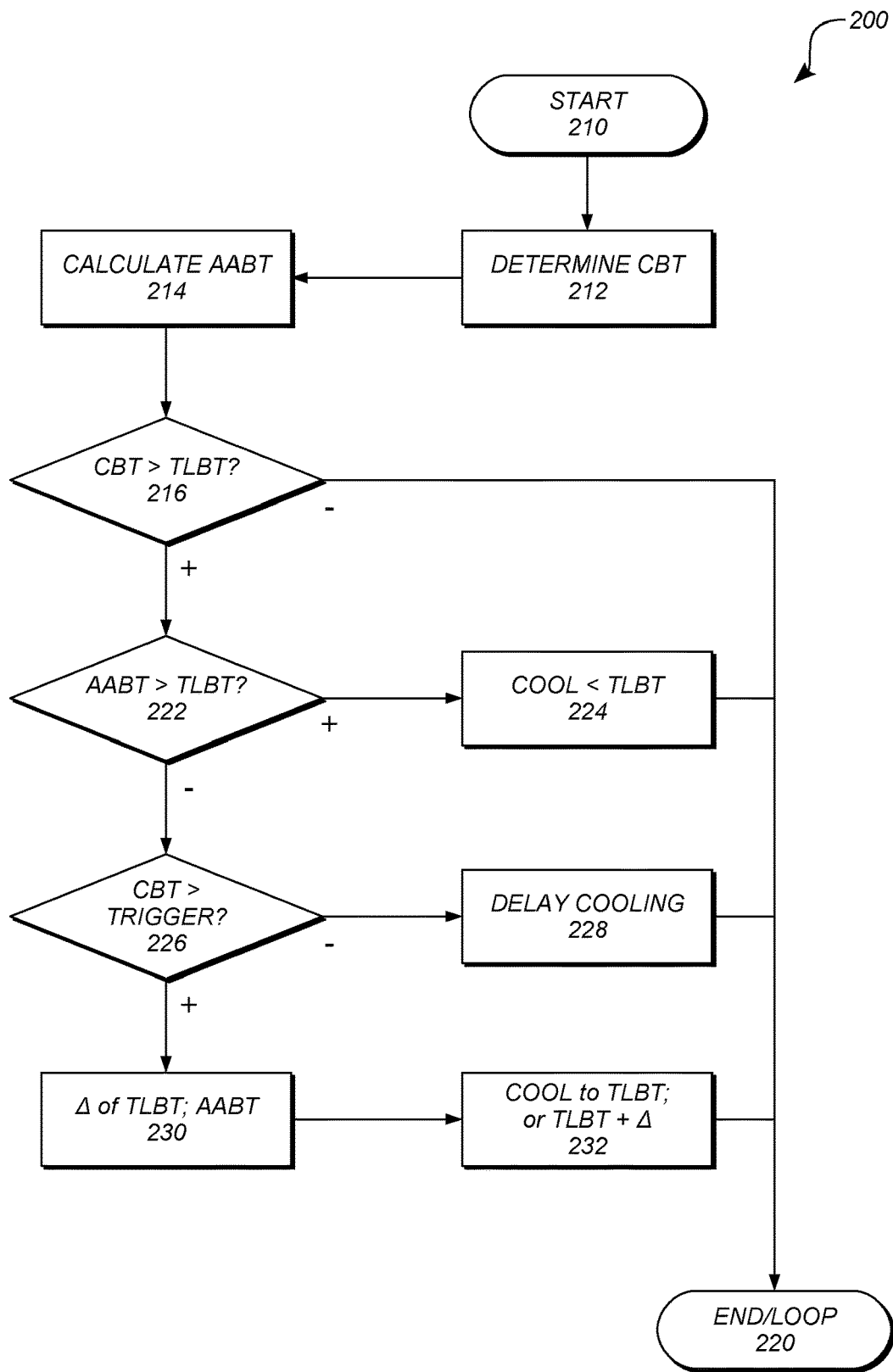
FIG. 6 shows an illustrative flow chart for a process of implementing a learned battery cooling strategy.

Referring to FIG. 6, and with continued reference to FIGS. 1-5D, there is shown a flow chart of a method 200 for executing thermal management strategies for selectively cooling the battery of a vehicle having an electric propulsion system, such as the vehicle 10. The method 200 shows some of the inputs and decisions that the controller 16 uses to determine when, and how much, to actively cool the battery 38.

The steps illustrated in FIG. 6 are exemplary of one specific algorithm or process and are not limiting. No steps are required, and any steps may be optional, whether or not identified as such. The order the steps or processes shown is also not limiting. As recognized by skilled artisans, steps may be reordered or realigned.

The method 200 shown in FIG. 6 may be used to control some of the situations shown in FIGS. 5A-D, and others.

However, note that neither the examples of FIGS. 5A-D nor the steps and flow of the method 200 are limiting.

Step 210: Start/Initialize.

The method 200 may begin operation only when called upon by the controller 16. For example, the method 200 may initialize whenever the vehicle 10 is being driven, has recently been driven, or is connected to the outside power source 39.

The method 200 may be executed by the controller 16, and may be constantly running or looping iteratively. Note that the method 200 illustrated by the flow chart of FIG. 6 may not show all possible processes or algorithms described herein, such that the method 200 is not exclusive of any processes not shown on the flow chart. Additionally, value comparisons are approximate, such that either greater than or less than designations may include equal to, and may include slight variations, up to 5%.

Step 212: Determine Current Battery Temperature (CBT).

The method 200 determines the CBT of the battery 38. This may include reading one or more sensors in communication with the battery 38, the coolant loop 24, or other locations of the vehicle 10. Additionally, interpretation of data from sensors or modeling of data from sensors or other inputs may be used to calculate or determine the CBT.

Step 214: Calculate Actual Average Battery Temperature (AABT).

The CBT calculated in step 212 will generally be stored by the controller 16. Past values of the CBT may then be used to calculate the AABT. Note that the AABT may be calculated as a true average, or may have weighting applied thereto.

Step 216: Is CBT greater than Target Lifetime Battery Temperature (TLBT)?

The CBT is compared to the TLBT. When the CBT is greater than the TLBT, the method 200 may include some remediation.

In some configurations of the method 200, the TLBT may also be compared to a predicted CBT of the current drive cycle. For example, even though the instantaneous CBT is less than the TLBT, the controller 16 may predict an increase in the CBT later in the drive cycle, and return a positive value—i.e., the CBT is greater than the TLBT—at the decision step 216.

Step 220: End/Loop.

Where the determination at decision step 216 is negative—i.e., the CBT is less than the TLBT—the method 200 may cut off or end. The method 200 may be running constantly, such that all steps may be occurring at any time. Alternatively, the method 200 may loop iteratively, such as on a schedule. Irrespective, when the method 200 reaches the end, it is likely that the process may repeat as long as any initialization conditions exist. Therefore, after reaching the end/loop step 220, the method may proceed back to start step 210.

Step 222: Is AABT greater than TLBT?

Where the determination at decision step 216 is positive—i.e., the CBT is greater than the TLBT—the method 200 proceeds to determine whether the AABT is greater than the TLBT. As illustrated in FIG. 5A, when the AABT is greater than the TLBT, the fact that the CBT is greater than the TLBT may not be ignored.

Step 224: Cool Battery to TLBT or Lower.

Where the determination at decision step 222 is positive—i.e., the AABT is greater than the TLBT—the method 200 has determined that there is need to reduce the temperature of the battery 38 (i.e., the CBT), which may extend the shelf life of the battery 38. Therefore, the controller 16 implements active cooling of the battery 38, such as via the coolant loop 24 and the HVAC system 78, or other means.

In some configurations, the controller 16 may cool the battery 38 a target temperature that is substantially equal to the TLBT. However, in other configurations, the method 200 may include calculation of a target temperature that is below TLBT, based on past, current, and predicted operating conditions of the vehicle 10. After cooling the battery 38 to the target temperature, the method 200 may proceed to the end/loop step 220.

Step 226: Is CBT greater than Trigger Temperature?

Where the determination at decision step 222 is negative—i.e., the AABT is less than the TLBT—the method 200 proceeds to determine whether the CBT is greater than a trigger temperature. As discussed above, the trigger temperature may represent a level above which the controller 16 will not allow the battery 38 to operate, irrespective of historical operation, including a low AABT.

Step 228: Delay Cooling.

Where the determination at decision step 222 is negative—i.e., the CBT is less than the trigger temperature—the method 200 delays cooling the battery 38. The amount of time by which active cooling is delayed may be configured based on the needs of the specific vehicle 10, or the controller 16 may continue delaying as long as each iteration or loop of the method 200 results in delayed cooling. The method 200 may then proceed to the end/loop step 220.

Step 230: Calculate Target Temperature.

Where the determination at decision step 226 is positive—i.e., the CBT is greater than the trigger temperature—the method 200 has determined that active cooling the battery 38 is warranted. Therefore, the controller 16 calculates or determines a target temperature to which the battery 38 will be cooled.

The target temperature may be determined via a function, as described above. Alternatively, and without limitation other target temperatures may include: the TLBT; the TLBT plus the differential between the TLBT and the AABT, or a preset value above or below the TLBT.

Step 232: Cool Battery to Target Temperature.

The method 200 then proceeds to actively cool the battery 38 to the target temperature. Note that this step may include determination of cooling aggressiveness, which may alter the speed/time to the target temperature.

As described above, in some situations, the method 200 may determine that the battery 38 should be very aggressively cooled, such that the battery 38 quickly reaches the target temperature. This may occur when environmental or driving conditions are favorable for efficient movement of thermal energy from the battery 38 to either the atmosphere or the cabin. In other situations, overall energy consumption may benefit from a slower cool, such that less aggressive cooling strategy is used to bring the battery 38, eventually, to the target temperature.

Figure 7A:
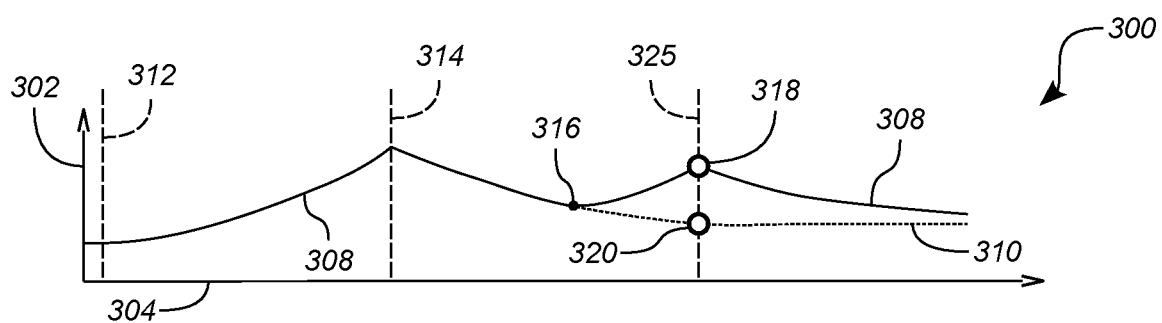
Figure 7B:
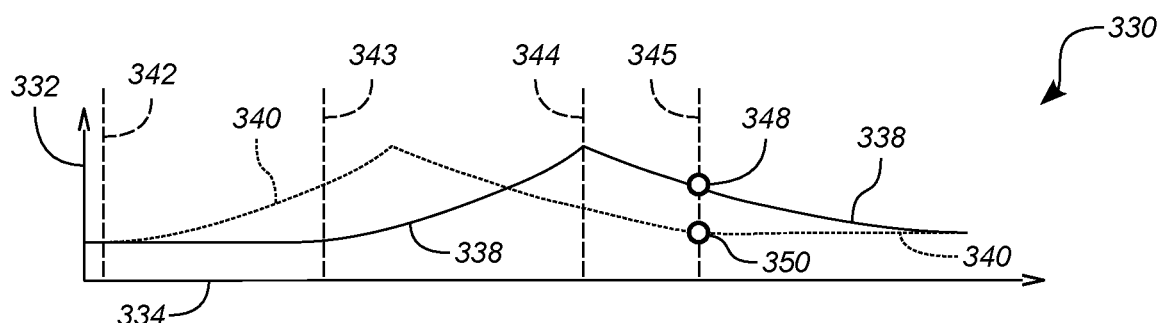
Figure 7C:
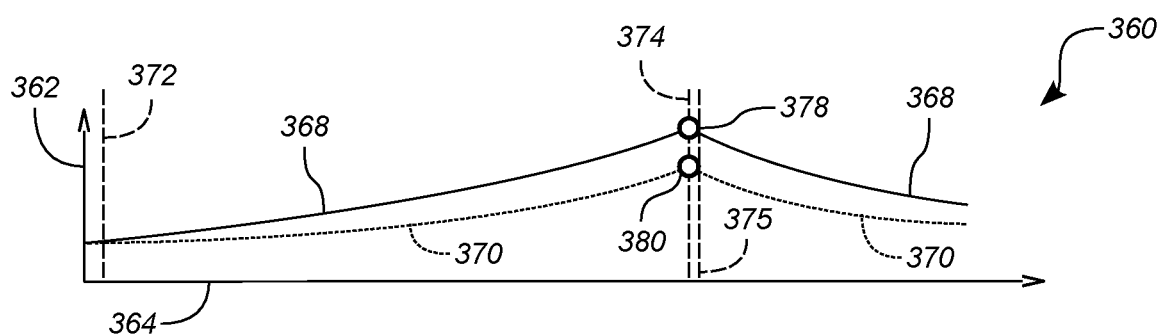

Referring also to FIGS. 7A-C, in addition to FIGS. 1-6, there are shown schematic charts illustrating exemplary thermal management strategies for selectively heating a battery, such as the battery 38 of the vehicle 10. Each of these charts illustrates heating while the vehicle 10 is off and connected to the outside power source 39, such that preconditioning may be used to extend subsequent driving range of the vehicle 10. Each of the examples shown in FIGS. 7A-C begins when the vehicle 10 is not driving and has been connected to the outside power source 39 for charging. The controller 16 may execute any calculations or determinations, and any instructions or commands. The outside power source 39 generally refers to electricity taken form the grid, such as that taken when plugged in at a driver's home, or garage, but may also refer to connection to home or industrial storage batteries. Connection to the outside power source 39 may also be referred to as wall power, because the vehicle 10 is often plugged into a wall outlet, or a power unit that is mounted on the wall.

FIG. 7A shows a graph 300 illustrating selectively heating the battery 38 to be used as a thermal storage device, based on a predicted drive cycle following the off-period of the vehicle 10. Battery temperature 302 is shown on the vertical axis and time 304 is shown on the horizontal axis.

The controller 16 tracks or determines a current battery temperature (CBT) 308. An unconditioned temperature 310 is also illustrated in the graph 300, as will be explained later. A plug time 312 occurs after the vehicle 10 is connected to the outside power source 39—i.e., the vehicle 10 is plugged into wall power—which is near the beginning of the time period illustrated in FIG. 7A.

In the example shown in FIG. 7A, the controller 16 instructs the OBCM 36 to begin charging the battery 38 substantially at the plug time 312. The OBCM 36 charges the battery 38 until a charge stop 314, which may coincide with the battery 38 reaching a predetermined state of charge (SOC), or another event, such as an increase in the cost of power from the outside power source 39 (such as may occur with smart metering of municipal power supplies). A charging period occurs between the plug time 312 and the charge stop 314, the time lapsed may be referred to as a charge duration.

As shown in FIG. 7A, during the charging period, the CBT 308 increases, as thermal energy is generated within the battery 38 by the charging process. However, following the charge stop 314, the CBT 308 decreases. In low temperature environments, where the cabin of the vehicle 10 will need to be heated, the decrease in CBT 308 represents lost thermal energy that could have been used to heat the cabin (possibly in conjunction with normal operation of the heat pump of the HVAC system 78). If stored, the thermal energy of the battery 38 could be transferred to the cabin of the vehicle 10, which would reduce the amount of energy needed to heat the cabin during the subsequent drive cycle.

Therefore, the controller 16 may predict a cabin heating temperature (CHT) of the vehicle 10 at its next drive cycle. This may be done, for example and without limitation, by comparison and analysis of prior driving cycles, such that the controller 16 determines regular driving patterns for the vehicle 10. For instance, the controller 16 may determine that every weekday, the vehicle 10 is started at around 7:15 AM, driven for approximately 35-40 minutes, and that the driver sets the cabin temperature to approximately 71 degrees Fahrenheit (22 degrees Celsius).

Note that the controller 16 may be in communication with, for example and without limitation, cloud based computing or data storage systems to assist in determining and predicting drive cycles and the weather conditions likely to occur. The predicted cabin heating temperature helps the controller 16 determine the amount of thermal energy needed to heat the cabin of the vehicle 10, such that the controller 16 can determine the amount of thermal energy stored in the battery 38 that would contribute to reaching the cabin heating temperature without drawing chemical energy from the battery 38.

As shown in FIG. 7A, at a heating start 316, the controller 16 turns on the coolant heater 30 which may be an electrically powered resistive heater, to add thermal energy to the flow of coolant 28 through the coolant loop 24. This thermal energy is absorbed into the battery 38, such that the CBT 308 rises relative to its unconditioned path downward. The thermal energy received from the resistive heater may be referred to as supplemental heating.

Therefore, after some time preconditioning the battery 38, the CBT 308 rises to a preconditioned target temperature 318. Comparatively, an unconditioned temperature 320 demonstrates the temperature of the battery 38 that would have occurred after the same amount of time without actively heating the battery 38 through the coolant heater 30.

The preconditioned target temperature 318 may also be referred to as a thermal storage temperature, as it represents the amount of thermal energy stored in the battery 38. The thermal storage temperature is greater than a target operating temperature for the battery 38, which is the temperature that the controller 16 would normally target when not using the battery 38 as a thermal storage device. Several example target operating temperatures are given relative to the discussion of FIGS. 5A-D, although many configurations may use the TLBT as the target operating temperature.

As shown in FIG. 7A, the preconditioned target temperature 318 occurs substantially at the same time as a drive start time 325, such that the additional thermal energy stored in the battery 38 may be used to heat the cabin of the vehicle 10 immediately at the beginning of the drive cycle. Note that the energy for the coolant heater 30 comes from the outside power source 39, as opposed to being drawn from the battery 38, such that the electric driving range of the vehicle 10 is not decreased by storage of thermal energy in the battery 38 as a thermal mass.

Contrarily, if the HVAC system 78, and a resistive heater or heat pump incorporated therein, was used to heat the cabin of the vehicle 10 from chemical energy (converted to electrical energy) stored in the battery 38, the electric driving range would have been decreased. After the drive start time 325, the CBT 308 decreases as thermal energy is pulled from the battery 38 to heat the cabin, such that there is substantially no long-term temperature increase in the battery 38.

The vehicle 10 may use other heat-generation techniques to warm the battery 38 as a thermal energy storage mass. For example, and without limitation, the controller 16 may effectively overdrive the OBCM 36 or drive the OBCM 36 in a calculatedly inefficient manner, such as off-phasing, so as to convert some amount of electrical energy from the outside power source 39 into thermal energy, or the OBCM 36 may quickly cycle power into and out of (charge/discharge cycle) the battery 38 to generate thermal energy within the battery 38. The other, non-charging, techniques used to transfer thermal energy to the battery 38 may be referred to as supplemental heating.

FIG. 7B shows a graph 330 illustrating modified charge cycle start time, such that thermal energy is selectively stored in the battery 38 as a result of charging. The graph 330 shows selectively heating the battery 38 to be used as a thermal storage device, based on a predicted drive cycle.

Battery temperature 332 is shown on the vertical axis and time 334 is shown on the horizontal axis. The controller 16 tracks or determines a current battery temperature (CBT) 338. An unconditioned or immediate charge temperature 340 is also illustrated in the graph 330, as will be explained later. A plug time 342 occurs after the vehicle 10 is connected to the outside power source 39—i.e., the vehicle 10 is plugged into wall power.

In the example shown in FIG. 7B, the controller 16 has determined that a drive start time 345 is well after the plug time 342, such that the charging period does not need to start immediately after the plug time 342 in order to sufficiently charge the battery 38 before the next drive cycle begins.

Factors used to predict the drive start time may include, for example and without limitation: month of the year, day of the week, drive history, and inputs from the driver of the vehicle 10. Driver inputs may come from an app or web-based interface that allows the driver to communicate information directly to the vehicle. For example, and without limitation, the driver may tell the controller 16 exactly when the next drive start time is planned, may alert the controller 16 that a specific route will be taken on the next drive cycle, or that the next drive start time will be significantly earlier than usual.

The immediate charge temperature 340 illustrates the temperature of the battery 38 if the controller 16 had instructed immediate charging beginning substantially at the plug time 342, as is the likely pattern for many electric vehicles. However, in the example shown in FIG. 7B, the controller 16 instructs the OBCM 36 to begin charging the battery 38 at a delayed charge time 343, which is calculated to fully charge the battery 38 prior to the drive start time 345 but is delayed from the plug time 342. The OBCM 36 charges the battery 38 until a charge stop 344, such that a charging period (the time lapse being a charge duration) occurs between the delayed charge time 343 and the charge stop 344.

As shown in FIG. 7B, during the charging period, the CBT 338 increases as thermal energy is generated within the battery 38 by the charging process. Because of the delayed charge time 343, the charge stop 344 is nearer to the drive start time 345. As shown by the CBT 338 and the immediate charge temperature 340, at the drive start time 345, a preconditioned target temperature 348 is higher than an unconditioned temperature 350. Therefore, there is more thermal energy stored in the battery 38 due to the calculated delay in the charging period. The preconditioned target temperature 348 may also be referred to as a thermal storage temperature, as it represents the amount of thermal energy stored in the battery 38.

In the example of FIG. 7B, the charge period is still completed prior to the drive start time 345. For example, if the controller estimates that the charging period will take approximately two hours, it may start charging the battery 38 approximately three hours prior to the predicted drive start time. If the vehicle 10 is driven early, there will likely be sufficient thermal energy from the natural charging energy, and sufficient state of charge in the battery 38. Alternatively, for example and without limitation, the controller 16 may start the charging period when there is approximately 125% of the amount of time needed for the charging period remaining until the drive start time, such that there is approximately a 25% buffer.

The controller 16 seeks to ensure both sufficient state of charge in the battery 38 and sufficient stored thermal energy in the battery 38. Therefore, it may start the charging period when it predicts, for example and without limitation, that the charging period will last at least 80% of the amount of time remaining before the drive start time, so that little of the stored thermal energy dissipates from the battery 38.

At the drive start time 345, the additional thermal energy stored in the battery 38 may be used to heat the cabin of the vehicle 10 immediately at the beginning of the drive cycle. Contrarily to the strategy employed in FIG. 7A, which used additional wall power to heat the battery 38, the increased thermal energy stored in the battery 38 in the strategy of FIG. 7B is all heat generated naturally as a result of the charging period.

However, the controller 16 delayed the start of the charging period to allow the battery 38 to carry thermal energy for use when the drive cycle begins at the drive start time 345. This is essentially free energy that can be used to heat the cabin of the vehicle 10, in lieu of using chemical energy stored in the battery 38 to power resistive heaters. The saved energy results in extended electric driving range for the vehicle 10, and does not cost the operator of the vehicle 10 anything for energy drawn from the outside power source 39.

FIG. 7C shows a graph 360 illustrating additional thermal energy added to the battery during recharge, such that thermal energy is selectively stored in the battery 38 for subsequent use. The graph 360 shows selectively heating the battery 38 to be used as a thermal storage device, based on a predicted drive cycle.

Battery temperature 362 is shown on the vertical axis and time 364 is shown on the horizontal axis. The controller 16 tracks or determines a current battery temperature (CBT) 368. An unconditioned temperature 370 is also illustrated in the graph 360, as will be explained herein.

A plug time 372 occurs substantially simultaneously with the vehicle 10 being connected to the outside power source 39—i.e., the vehicle 10 is plugged into wall power. In the example shown in FIG. 7C, the controller 16 instructs the OBCM 36 to begin charging the battery 38 substantially at the plug time 372. The OBCM 36 charges the battery 38 until a charge stop 374. A charging period occurs between the plug time 372 and the charge stop 374.

However, in this case, the charge stop 374 substantially coincides with a drive start 375. This situation may occur when, for example and without limitation, the vehicle 10 is returned to its charging station later in the day than normal.

The controller 16 still correctly predicts the drive start 375, such that the controller 16 accounts for the shortened charge and preconditioning period. Therefore, early in the charging period, the controller 16 instructs additional heating of the battery 38 with power drawn from the outside power source 39. This additional heating ensures both that the battery 38 is sufficiently charged for the upcoming driving cycle and that there is sufficient thermal energy stored in the battery 38 for cabin heating.

A preconditioned target temperature 378 shows the temperature of the battery 38 at the drive start 375, with the assistance of the supplemental heating, and an unconditioned temperature 380 illustrates the temperature that battery 38 would have reached, if not for the supplemental heating. The preconditioned target temperature 378 may also be referred to as a thermal storage temperature, as it represents the amount of thermal energy stored in the battery 38.

As shown in FIG. 7C, during the charging period, the CBT 368 increases as thermal energy is generated within the battery 38 by the charging process. Additionally, as the controller 16 commands additional heating, the CBT 368 further increases, relative to the unconditioned temperature 370, which illustrates the temperature of the battery 38 due solely to charging. Therefore, there is thermal energy stored in the battery 38 due to the natural charging thermal energy and the additional thermal energy created by intentionally heating the battery 38.

At the drive start 375, the additional thermal energy stored in the battery 38 may be used to heat the cabin of the vehicle 10 immediately at the beginning of the drive cycle. Contrary to the strategy employed in FIG. 7A, which solely used additional wall power to heat the battery 38, and contrary to the strategy employed in FIG. 7B, which solely used natural charging power to heat the battery 38, the strategy of FIG.

7C combines both charging power and wall power to store additional thermal energy in the battery 38.

The increased thermal energy stored in the battery 38 as a result of the strategy of FIG. 7C allows cabin heating without tapping into the stored chemical energy of the battery 38. The saved energy results in extended electric driving range for the vehicle 10.

Note that all of the situations described in FIGS. 7A-C are subject to limit requirements for the temperature of the battery 38. For example, even if it would be efficient to further warm the battery 38 for cabin heating, the controller 16 will not do so if the temperature of the battery 38 is, or would be, greater than a warming limit. The warming limit may be, for example and without limitation: the same as the maximum limit temperature 136 discussed relative to FIG. 5B, an overall battery protection limit, or another value that is specific to the techniques for using the battery 38 as a thermal storage mass discussed herein.

Figure 8:
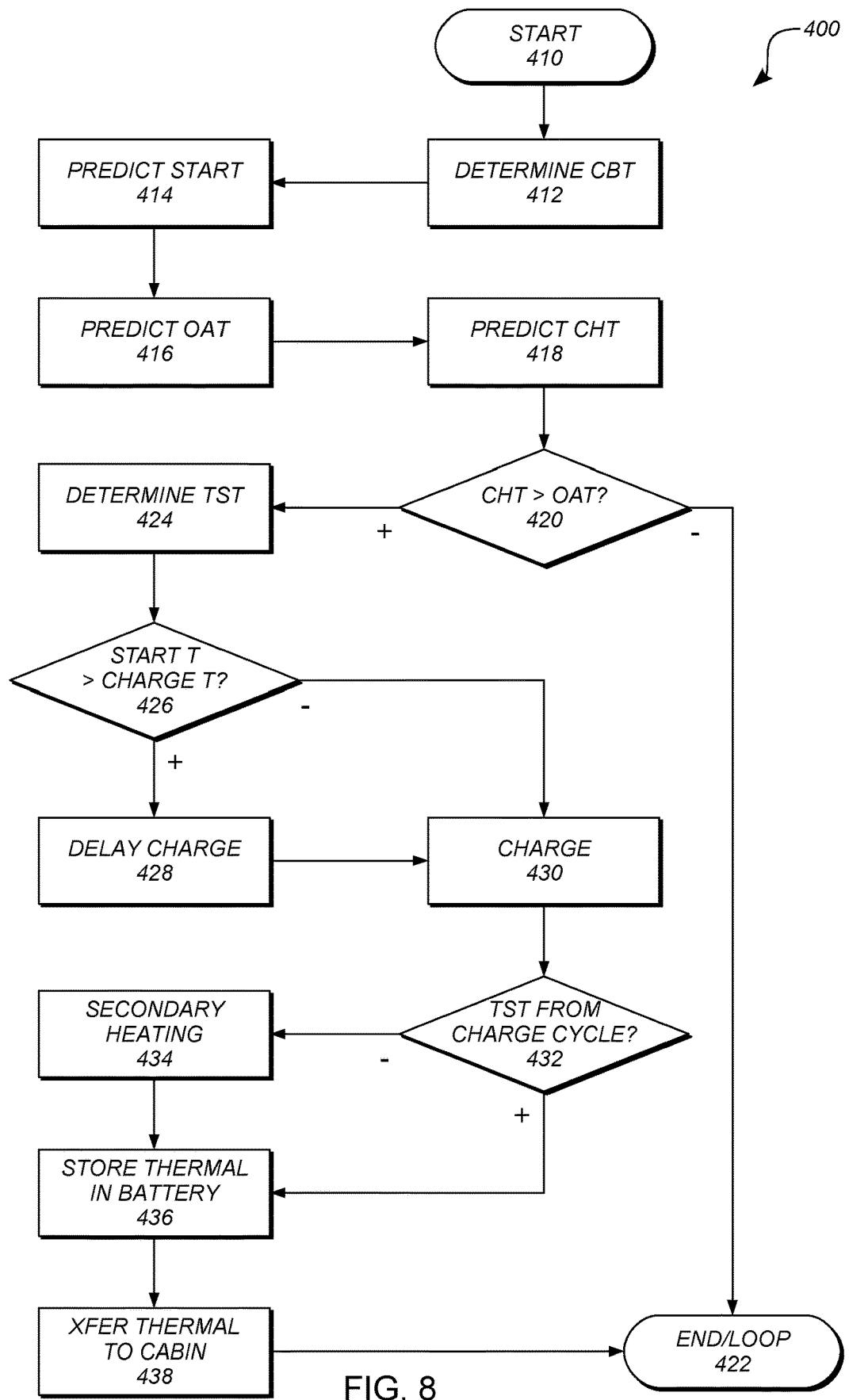
FIG. 8 shows an illustrative flow chart for a process of using a battery as a thermal energy storage device for cabin heating.

Referring to FIG. 8, and with continued reference to FIGS. 1-7C, there is shown a flow chart of a method 400 for executing thermal management strategies for selectively heating a battery of a vehicle having an electric propulsion system, such as the vehicle 10. The method 400 shows some of the inputs and decisions that the controller 16 uses to determine when, and to what extent, to heat the battery 38.

The steps illustrated in FIG. 8 are exemplary of one specific algorithm or process and are not limiting. No steps are required, and any steps may be optional, whether or not identified as such. The order of the steps or processes shown is also not limiting. As recognized by skilled artisans, steps may be reordered or realigned.

The method 400 shown in FIG. 8 may be used to control some of the situations shown in FIGS. 7A-C, and others. However, note that neither the examples of FIGS. 7A-C nor the steps and flow of the method 400 are limiting.

Step 410: Start/Initialize.

The method 400 may begin operation only when called upon by the controller 16. For example, the method 400 may initialize whenever the vehicle 10 has recently stopped a drive cycle and has been connected to the outside power source 39.

The method 400 may be executed by the controller 16, and may be constantly running or looping iteratively. Note that the method 400 illustrated by the flow chart of FIG. 8 may not show all possible processes or algorithms described herein, such that the method 400 is not exclusive of processes not shown on the flow chart. Additionally, value comparisons are approximate, such that either greater than or less than designations may include equal to, and may also include slight variations, up to 5%.

Step 412: Determine Current Battery Temperature (CBT).

The method 400 determines the CBT of the battery 38. This may include reading one or more sensors in communication with to battery 38, the coolant loop 24, or other locations of the vehicle 10. Additionally, interpretation of data from sensors or modeling of data from sensors or other inputs may be used to calculate or determine the CBT.

Step 414: Predict Drive Start Time.

The method 400 predicts or estimates when the next drive cycle of the vehicle 10 will occur. The beginning of the drive cycle determines the amount of time available to the controller 16 to precondition the battery 38. Historical drive cycle data for the specific vehicle 10 may be used to predict the drive start time. As discussed above, factors used to predict the drive start time may include, for example and without limitation: month of the year, day of week, drive history, and inputs from the driver of the vehicle 10.

Step 416: Determine or Calculate Outside Air Temperature (OAT).

The method 400 determines the outside air temperature, which represents the conditions expected during the drive cycle for the vehicle 10. Note that the outside air temperature may be different from the ambient temperature, particularly when the vehicle 10 is parked in a conditioned garage. Therefore, the outside air temperature may be determined based on communications networks and weather data. Furthermore, the outside air temperature may be estimated based on the predicted drive start time. For example, the controller 16 may link to the internet to determine what the outside air temperature will be at the beginning of the upcoming drive cycle—i.e., if it is 1:00 AM, and the next drive cycle is predicted to begin at 7:00 AM, the method 200 will use the expected outside air temperature at 7:00 AM.

Step 418: Predict Cabin Heating Temperature (CHT).

The method 400 then predicts or estimates the cabin heating temperature that will be requested by occupants of the vehicle 10 at the next drive cycle. For example, the controller 16 may determine that the driver is likely to set the cabin temperature to approximately 71 degrees Fahrenheit (22 degrees Celsius).

Step 420: Is CHT >OAT?

The method 400 compares the cabin heating temperature to the outside air temperature. This determines whether it will be beneficial to store thermal energy in the battery 38 to subsequently heat the cabin, or whether environmental conditions will negate the need for additional cabin heat.

Step 422: End/Loop.

Where the determination at decision step 420 is negative—i.e., the cabin heating temperature is less than the outside air temperature—there is little or no need to store thermal energy in the battery 38 in order to heat the cabin. Therefore, the method 400 may cut off or end. If the outside air temperature is predicted to be greater than the cabin heating temperature, the cabin will likely need to be cooled, and, at least, will not require significant heating from stored thermal energy in the battery 38.

The method 400 may be running constantly, such that all steps may be occurring at any time. Alternatively, the method 400 may loop iteratively, such as on a schedule. Irrespective, when the method 400 reaches the end, it is likely that the process may repeat as long as any initialization conditions exist. Therefore, after reaching the end/loop step 422, the method may proceed back to start step 410.

Step 424: Determine Thermal Storage Temperature (TST).

Where the determination at decision step 420 is positive—i.e., the cabin heating temperature is greater than the outside air temperature—the method 400 has recognized that the cabin would benefit from thermal energy stored in the battery 38. Therefore, the method 400 determines a thermal storage temperature for the battery 38. The thermal storage temperature represents a target amount of thermal energy stored within the battery 38 for use by the cabin during the predicted subsequent drive cycle.

Step 426: Is Start Time Later than Charge Duration?

The method 400 may determine how, and when, thermal energy should be created in, or moved to, the battery 38. Therefore, the method 400 determines whether the drive start time will be later than the amount of time needed to charge the battery 38. This determines whether the method 400 has the option of delaying charging.

Determination of the charge, or recharge, time may be a function of several current and historical data inputs from the vehicle 10. This is a physics-based calculation, and is specific to, at least, the battery 38 and the OBCM 36. For example, and without limitation, the controller 16 may calculate charge duration as a function of: state of charge, charge method or maximum charge current, recharge efficiency, ambient temperature, driver input, and heater thermal energy consumed.

As one example, the base recharge or charge time may be calculated by dividing the expected total electric energy by the average current flow from the charger, such that: Base Charge Time=Electrical Energy/Average Amperage. Where achieving the target SOC of the battery 38 requires 40 kWh of energy and the outside power source 39 provides an average of 15 kW of power, this will take approximately 160 minutes (2⅔ hours).

In some configurations, the charge time may also be calculated to account for the time needed to reach a minimum charging temperature and/or the time needed to condition the battery 38 to the thermal storage temperature. The time to heat to the minimum temperature may be a function of the difference between the current and minimum temperature of the battery 38, the thermal capacity of the battery 38, and the heat transfer and internal heat generation rates. Therefore: Time to Heat to Minimum=Temperature Δ*(Battery Thermal Capacity*Battery Mass)/(Heat Transfer Rate+Internal Heat Generation Rate). Where the temperature of the battery 38 needs to be raised by 15 degrees Celsius to meet the minimum charging temperature, this will take between 6 and 7 minutes.

Note that the controller 16 may also calculate the amount of time needed to condition the battery 38 to the thermal storage temperature. The conditioning time is a similar function as that time to minimum temperature (above). Therefore: Conditioning Time=Temperature Δ*(Battery Thermal Capacity*Battery Mass)/(Heat Transfer Rate+Internal Heat Generation Rate). Where the temperature of the battery 38 needs to be raised by 10 degrees Celsius to meet the thermal storage temperature, conditioning will take between 4 and 5 minutes.

At step 426, the method 400 may compare the time until start to the Base Charge Time, the Time to Heat to Minimum, the Conditioning Time, the sum of all 3, or combinations thereof. Other charge duration or charge time calculations may be utilized, as recognized by skilled artisans.

Step 428: Delay Charging and Heating.

Where the determination at decision step 426 is positive—i.e., there is more time before the predicted drive start time than is needed to charge the battery—the method 400 has recognized that it can delay charging the battery 38. Therefore, in order to time the end of the charging period with the drive start time, the controller 16 may delay charging, such that thermal energy created in the battery 38 by the charging process will remain in the battery 38 at start time. One example of this is shown in FIG. 7B.

Note, however, that before considering heating techniques, or timelines, the controller 16 may ensure that there is a sufficient minimum charge in the battery 38. For example, even if there would be a benefit to delaying the charging period for several hours, the controller may charge the battery 38 to a minimum level. For example, if the state of charge of the battery was very low at the end of the previous drive cycle, the controller may increase the state of charge, just in case the vehicle 10 is used prior to the predicted drive start time.

The amount of time lapsed during the charging delay may be adjusted by the controller 16 to promote retention of thermal energy within the battery 38, while also leaving some ability for error in the predicted drive start time. For example, and without limitation, the method 400 may estimate the charging period as taking approximately two hours, and then start charging the battery 38 approximately three hours prior to the predicted drive start time. If the vehicle 10 is driven early, there will likely be sufficient thermal energy from the natural charging energy, and sufficient state of charge in the battery 38.

Step 430: Charging.

Following the delay period, if any, the method 400 begins charging the battery. Generally, the charging period will continue until either the battery 38 reaches a target state of charge or the vehicle 10 is disconnected from the outside power source 39.

Step 432: Thermal Storage Temperature from Charge Alone?

After, or contemporaneously with, beginning to charge the battery 38, the method 400 considers whether the thermal storage temperature can be reached due to the natural thermal energy generated as a result charging. While charging the battery 38 will increase the temperature of the battery 38, it may not, necessarily, increase to the thermal storage temperature that would be preferred for reducing subsequent cabin heating needs.

Step 434: Secondary Heating.

Where the determination at decision step 432 is negative—i.e., the charging cycle will not produce sufficient thermal energy to raise the battery 38 to the thermal storage temperature—the method 400 has recognized that it may need secondary heating to get the battery 38 to the thermal storage temperature. Therefore, in order to store sufficient thermal energy in the battery 38, the controller 16 may command, for example and without limitation: resistive heating introduced to the coolant loop 24, inefficient charging of the battery 38 by the OBCM 36, or cycled charging and discharging of the battery 38.

Step 436: Store Thermal Energy in Battery.

The thermal energy generated by the method 400, through charging the battery 38, secondary heating of the battery 38, or both, is stored in the battery 38 as a thermal storage device or mass.

Step 438: Transfer Thermal Energy from Battery to Cabin.

At the drive start time, the method 400 transfers the stored thermal energy of the battery 38 to the cabin to increase the temperature of the cabin to the cabin heating temperature. Transfer may occur, for example and without limitation, via the coolant loop 24 and the chiller 50 to the HVAC system 78 acting as a heat pump. The cabin is, therefore, warmed with thermal energy stored in the battery 38, as opposed to chemical energy transferred from the battery 38 to a resistive heater or the heat pump, which would reduce the driving range of the vehicle. After transferring the thermal energy of the battery 38 to the cabin for warming, the method 400 may proceed to the end/loop step 422.

The detailed description and the drawings or figures are supportive and descriptive of the subject matter herein. While some of the best modes and other embodiments have been described in detail, various alternative designs, embodiments, and configurations exist.

Furthermore, the embodiments shown in the drawings or the characteristics of various embodiments mentioned in the present description are not necessarily independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, additional embodiments fall within the framework of the scope of the appended claims.

The invention claimed is:

1. A method for managing thermal energy of a battery in a vehicle having an electric propulsion system, comprising:
   monitoring a current battery temperature, after the vehicle is connected to an outside power source at a plug time;
   determining an outside air temperature;
   predicting a cabin heating temperature for a subsequent drive cycle, wherein the subsequent drive cycle occurs when the vehicle is no longer connected to the outside power source; and
   if the predicted cabin heating temperature is greater than the outside air temperature, heating the battery to a thermal storage temperature that is greater than a target operating temperature of the battery, such that thermal energy is stored within the battery.

2. The method of claim 1, wherein heating the battery to the thermal storage temperature occurs while charging the battery from the outside power source.

3. The method of claim 2, wherein heating occurs only if the thermal storage temperature and the cabin heating temperature are both greater than the outside air temperature.

4. The method of claim 1, further comprising:
   transferring the thermal energy stored within the battery to a cabin of the vehicle.

5. The method of claim 4, wherein heating to the thermal storage temperature occurs prior to a driving start time, wherein the driving start time occurs after the vehicle is disconnected from the outside power source.

6. The method of claim 1, further comprising:
   predicting a driving start time, wherein the driving start time occurs after the vehicle is disconnected from the outside power source;
   determining a charge duration between a charge start and a charge stop, at which the battery receives substantially a full state of charge;
   if the driving start time is later than the charge duration, delaying the charge start until after the plug time; and
   beginning the charge start such that the charge duration is at least 80% of the time lapse before the predicted driving start time.

7. The method of claim 6, further comprising:
   wherein the charge duration is calculated to include a base charge time, during which the battery is brought to a target state of charge, and a time to heat to a minimum charging temperature, during which the battery is brought to a minimum temperature for charging.

8. The method of claim 7, further comprising:
   wherein the charge duration is calculated to include a conditioning time, during which the battery is heated by one of a resistive heater and a heat pump.

9. The method of claim 6, further comprising:
   transferring the thermal energy stored within the battery to a cabin of the vehicle, after the driving start time.

10. The method of claim 1, further comprising:
    generating thermal energy with one of a resistive heater and a heat pump, while the vehicle is connected to the outside power source; and
    circulating the generated thermal energy to the battery, such that the thermal storage temperature is greater than a natural charging temperature.

11. The method of claim 10, further comprising:
    transferring the thermal energy stored within the battery to a cabin of the vehicle.

12. A vehicle having an electric propulsion system, comprising:
    a battery; and
    a controller operatively connected to the battery, wherein the controller is configured to:
       monitor a current battery temperature after the vehicle is connected to an outside power source at a plug time;
       determine an outside air temperature;
       predict a cabin heating temperature of the vehicle for a subsequent drive cycle, wherein the subsequent drive cycle occurs when the vehicle is no longer connected to the outside power source;
       if the predicted cabin heating temperature is greater than the outside air temperature, heat the battery to a thermal storage temperature that is greater than a target operating temperature of the battery, such that thermal energy is stored within the battery, wherein heating the battery to the thermal storage temperature occurs while charging the battery from the outside power source; and
       transfer the thermal energy stored within the battery to a cabin of the vehicle.

13. The vehicle of claim 12, wherein the controller is further configured to:
    heat the battery only if the thermal storage temperature and the cabin heating temperature are both greater than the outside air temperature.

14. The vehicle of claim 12, wherein the controller is further configured to:
    predict a driving start time, wherein the driving start time occurs after the vehicle is disconnected from the outside power source;
    calculate a charge duration between a charge start and a charge stop, occurring when the battery receives a substantially a full state of charge;
    if the driving start time is later than the charge duration, delay the charge start until after the plug time; and
    begin the charge start such that the charge duration is at least 80% of the time lapse before the predicted driving start time.

15. The vehicle of claim 14, wherein the controller is further configured to calculate the charge duration to include:
    a base charge time, during which the battery is brought to a target state of charge;
    a time to heat to a minimum charging temperature, during which the battery is brought to a minimum temperature for charging; and
    a conditioning time, during which the battery is heated by one of a resistive heater and a heat pump.

16. The vehicle of claim 12, wherein the controller is further configured to:
    generate thermal energy with one of a resistive heater and a heat pump while the vehicle is connected to the outside power source; and
    circulate the generated thermal energy to the battery, such that the thermal storage temperature is greater than a natural charging temperature.

* * * * *